US012664022B2

(12) United States Patent
Ohayon et al.

(10) Patent No.: US 12,664,022 B2
(45) Date of Patent: Jun. 23, 2026

(54) SPARE RESOURCE AVAILABILITY PREDICTION WITH LIMITED HISTORICAL DATA

(71) Applicant: FLEXERA SOFTWARE LLC, Itasca, IL (US)

(72) Inventors: Tal Ohayon, Tel Aviv (IL); Idan Schwartz, Tel Aviv (IL)

(73) Assignee: FLEXERA SOFTWARE LLC, Itasca, IL (US)

( * ) Notice: Subject to any disclaimer, the term of this patent is extended or adjusted under 35 U.S.C. 154(b) by 859 days.

(21) Appl. No.: 18/046,970

(22) Filed: Oct. 17, 2022

(65) Prior Publication Data

US 2024/0054019 A1 Feb. 15, 2024

Related U.S. Application Data

(60) Provisional application No. 63/370,976, filed on Aug. 10, 2022.

(51) Int. Cl.
*G06F 9/46* (2006.01)
*G06F 9/48* (2006.01)
*G06F 9/50* (2006.01)

(52) U.S. Cl.
CPC .......... *G06F 9/5033* (2013.01); *G06F 9/4812* (2013.01)

(58) Field of Classification Search
CPC ............................ G06F 9/5033; G06F 9/4812
See application file for complete search history.

(56) References Cited

U.S. PATENT DOCUMENTS

| | | | |
|---|---|---|---|
| 10,970,113 B1 * | 4/2021 | Kurtzer | G06F 9/5005 |
| 2021/0208930 A1 * | 7/2021 | Balasubramanian | |
| | | | G06F 9/5044 |
| 2022/0129322 A1 | 4/2022 | Schwartz et al. | |
| 2024/0069998 A1 * | 2/2024 | Chatterjee | G06F 9/5027 |

OTHER PUBLICATIONS

Lee, et al., "SpotLake: Diverse Spot Instance Dataset Archive Service," arXiv:2202.02973v2 [cs.DC] Oct. 25, 2022.
Cohen, "Maximum availability without risk: Spot market scoring explained," Dec. 13, 2021, https://spot.io/blog/maximum-availability-without-risk-spot-market-scoring-explained/.
amazon.com, "Introducing Amazon EC2 Spot placement score," Oct. 27, 2021, https://aws.amazon.com/about-aws/whats-new/2021/10/amazon-ec2-spot-placement-score/.

* cited by examiner

*Primary Examiner* — Tammy E Lee
(74) *Attorney, Agent, or Firm* — BARNES & THORNBURG LLP

(57) ABSTRACT

A system can comprise a memory that stores computer executable components, and a processor that executes the computer executable components stored in the memory. The computer executable components can comprise a correlation component that, based on a first context defining a first spare resource instance to be utilized in a networked system, identifies a second spare resource instance, and an evaluation component that generates an availability score defining prediction of availability of the first spare resource instance based on a second context defining the second spare resource instance, wherein the evaluation component further deploys the first spare resource instance, based on the availability score, in the networked system.

20 Claims, 11 Drawing Sheets

Figure 2:
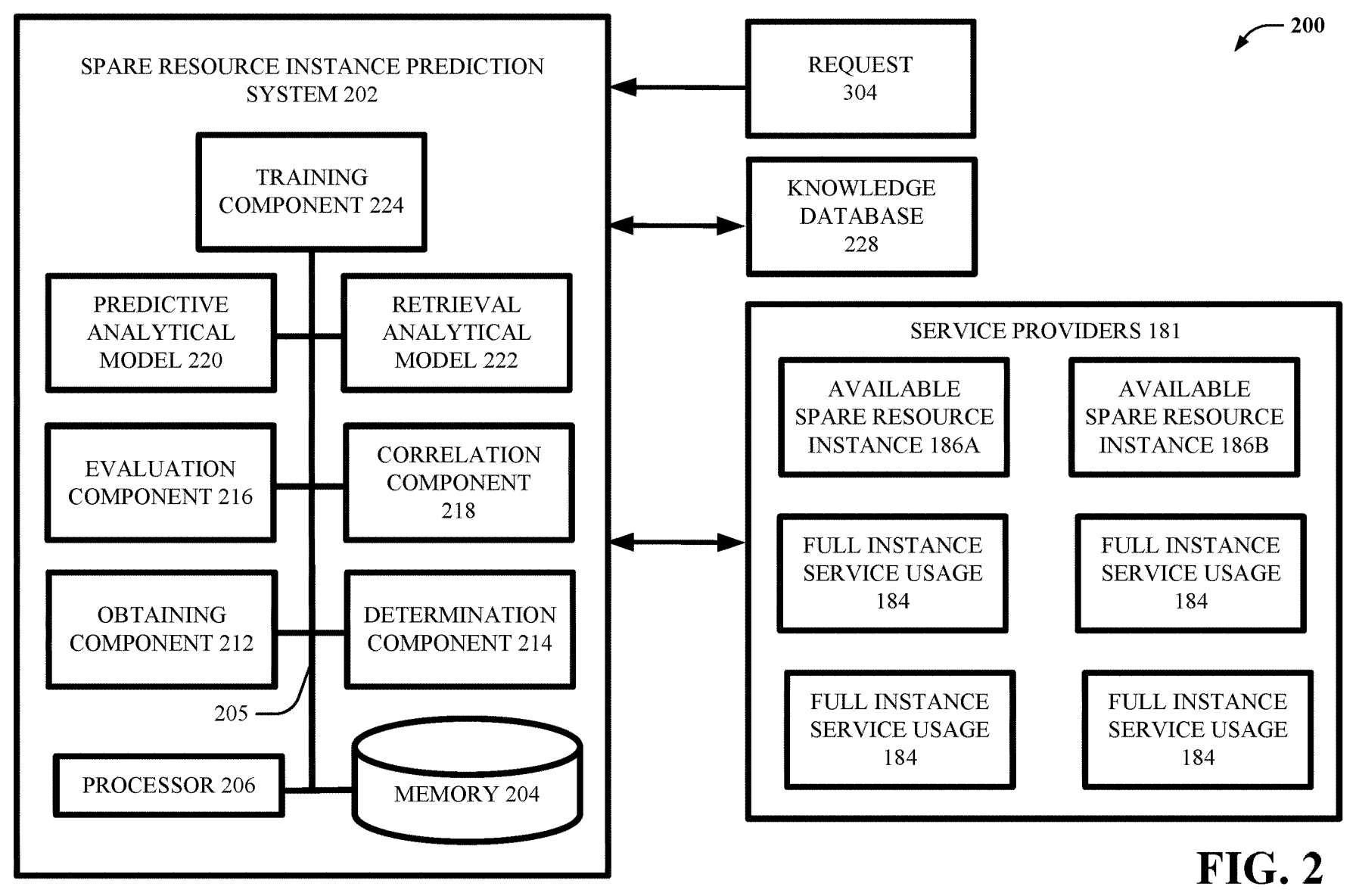

200

SPARE RESOURCE INSTANCE PREDICTION SYSTEM 202

TRAINING COMPONENT 224

RETRIEVAL ANALYTICAL MODEL 222

CORRELATION COMPONENT 218

DETERMINATION COMPONENT 214

PREDICTIVE ANALYTICAL MODEL 220

EVALUATION COMPONENT 216

OBTAINING COMPONENT 212

205

PROCESSOR 206

MEMORY 204

REQUEST 304

KNOWLEDGE DATABASE 228

SERVICE PROVIDERS 181

AVAILABLE SPARE RESOURCE INSTANCE 186B

FULL INSTANCE SERVICE USAGE 184

FULL INSTANCE SERVICE USAGE 184

AVAILABLE SPARE RESOURCE INSTANCE 186A

FULL INSTANCE SERVICE USAGE 184

FULL INSTANCE SERVICE USAGE 184

Figure 4:
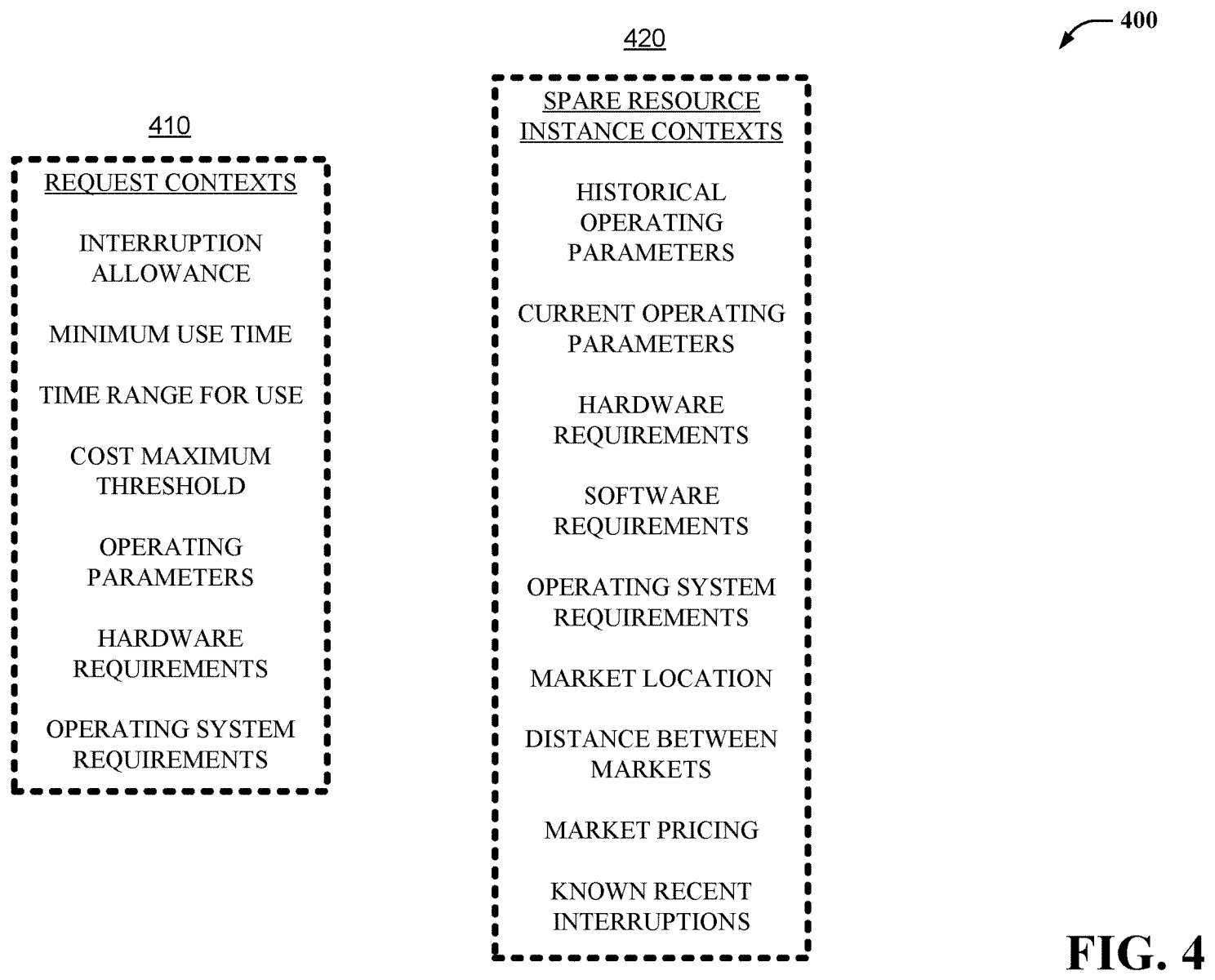

SPARE RESOURCE
INSTANCE CONTEXTS

HISTORICAL
OPERATING
PARAMETERS

CURRENT OPERATING
PARAMETERS

HARDWARE
REQUIREMENTS

SOFTWARE
REQUIREMENTS

OPERATING SYSTEM
REQUIREMENTS

MARKET LOCATION

DISTANCE BETWEEN
MARKETS

MARKET PRICING

KNOWN RECENT
INTERRUPTIONS

410

REQUEST CONTEXTS

INTERRUPTION
ALLOWANCE

MINIMUM USE TIME

TIME RANGE FOR USE

COST MAXIMUM
THRESHOLD

OPERATING
PARAMETERS

HARDWARE
REQUIREMENTS

OPERATING SYSTEM
REQUIREMENTS

500

FIG. 5

New
Subset E

Short Term
Interruption
Data

Short Term
Operating
Parameter Data

Request 304

Interruption
Allowance

Time Range
Availability

Correlated
Interruption
Data

Correlated
Operating
Parameter Data

Time
Availability

Correlated
Interruption
Data

Correlated
Operating
Parameter Data

Historical
Interruption
Data

Historical
Operating
Parameter Data

Known
Subset A

CORRELATION OF KNOWN SUBSET A TO NEW SUBSET E

COLLECTED REAL TIME RESULT DATA

| Incorrect Replacements (%) | Enriched - new subsets (%) | Original - new subsets (%) | Enriched - all subsets (%) | Original - all subsets (%) |
|---|---|---|---|---|
| 15 | 19.8 | 23.1 (+2.3) | 18.8 | 20.5 (+1.7) |
| 20 | 13.1 | 15.5 (+2.4) | 12.3 | 14.1 (+1.8) |
| 25 | 8.9 | 10.5 (+1.6) | 8.4 | 9.8 (+1.4) |
| 30 | 6.2 | 7.6 (+1.4) | 5.7 | 6.7 (+1.0) |
| 35 | 4.2 | 5.1 (+0.9) | 4.0 | 4.6 (+0.6) |
| 40 | 3.0 | 3.7 (+0.7) | 2.8 | 3.3 (+0.5) |
| 45 | 1.9 | 2.7 (+0.8) | 1.8 | 2.4 (+0.6) |
| 50 | 1.3 | 1.8 (+0.5) | 1.2 | 1.6 (+0.4) |

800 —

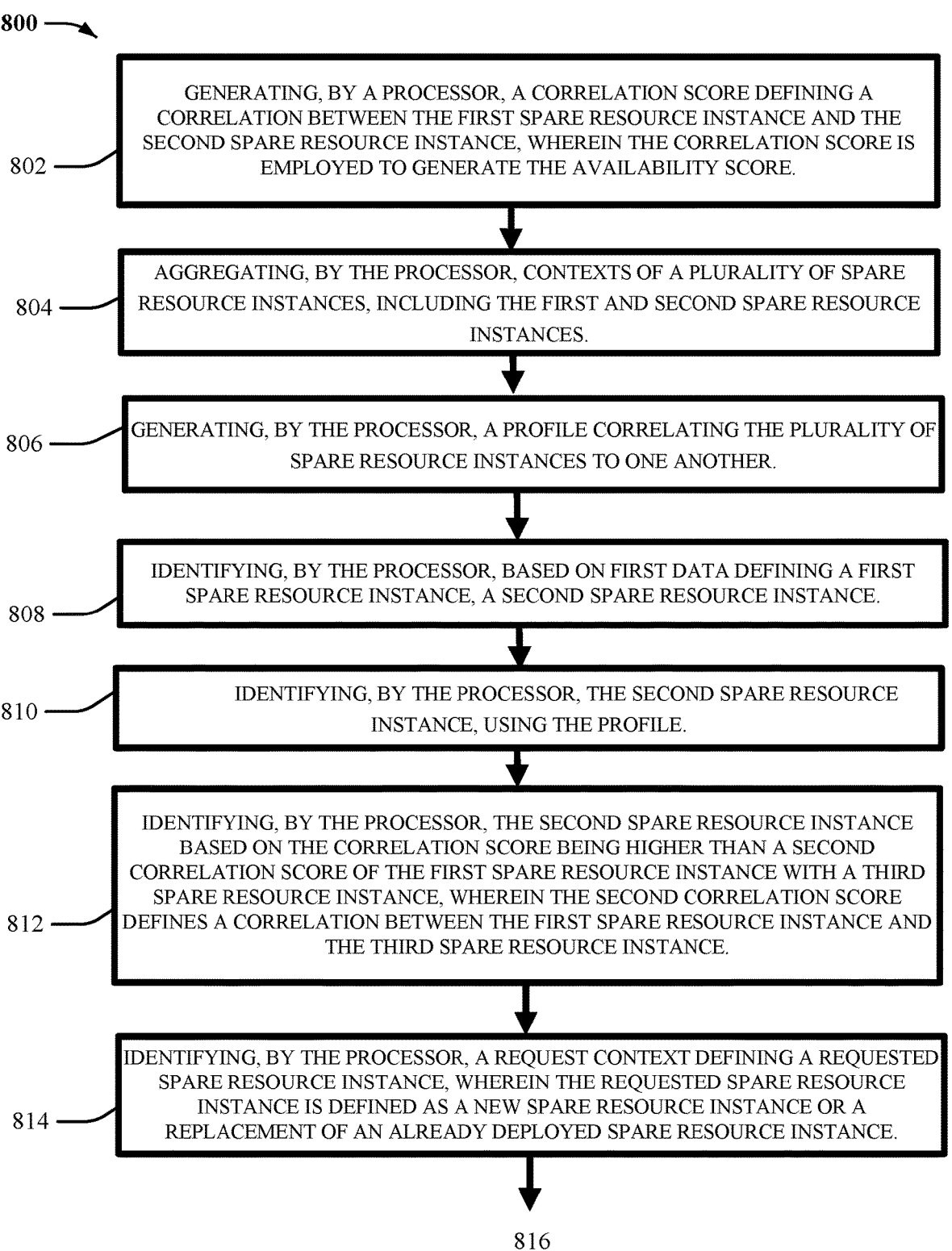

802 — GENERATING, BY A PROCESSOR, A CORRELATION SCORE DEFINING A CORRELATION BETWEEN THE FIRST SPARE RESOURCE INSTANCE AND THE SECOND SPARE RESOURCE INSTANCE, WHEREIN THE CORRELATION SCORE IS EMPLOYED TO GENERATE THE AVAILABILITY SCORE.

804 — AGGREGATING, BY THE PROCESSOR, CONTEXTS OF A PLURALITY OF SPARE RESOURCE INSTANCES, INCLUDING THE FIRST AND SECOND SPARE RESOURCE INSTANCES.

806 — GENERATING, BY THE PROCESSOR, A PROFILE CORRELATING THE PLURALITY OF SPARE RESOURCE INSTANCES TO ONE ANOTHER.

808 — IDENTIFYING, BY THE PROCESSOR, BASED ON FIRST DATA DEFINING A FIRST SPARE RESOURCE INSTANCE, A SECOND SPARE RESOURCE INSTANCE.

810 — IDENTIFYING, BY THE PROCESSOR, THE SECOND SPARE RESOURCE INSTANCE, USING THE PROFILE.

812 — IDENTIFYING, BY THE PROCESSOR, THE SECOND SPARE RESOURCE INSTANCE BASED ON THE CORRELATION SCORE BEING HIGHER THAN A SECOND CORRELATION SCORE OF THE FIRST SPARE RESOURCE INSTANCE WITH A THIRD SPARE RESOURCE INSTANCE, WHEREIN THE SECOND CORRELATION SCORE DEFINES A CORRELATION BETWEEN THE FIRST SPARE RESOURCE INSTANCE AND THE THIRD SPARE RESOURCE INSTANCE.

814 — IDENTIFYING, BY THE PROCESSOR, A REQUEST CONTEXT DEFINING A REQUESTED SPARE RESOURCE INSTANCE, WHEREIN THE REQUESTED SPARE RESOURCE INSTANCE IS DEFINED AS A NEW SPARE RESOURCE INSTANCE OR A REPLACEMENT OF AN ALREADY DEPLOYED SPARE RESOURCE INSTANCE.

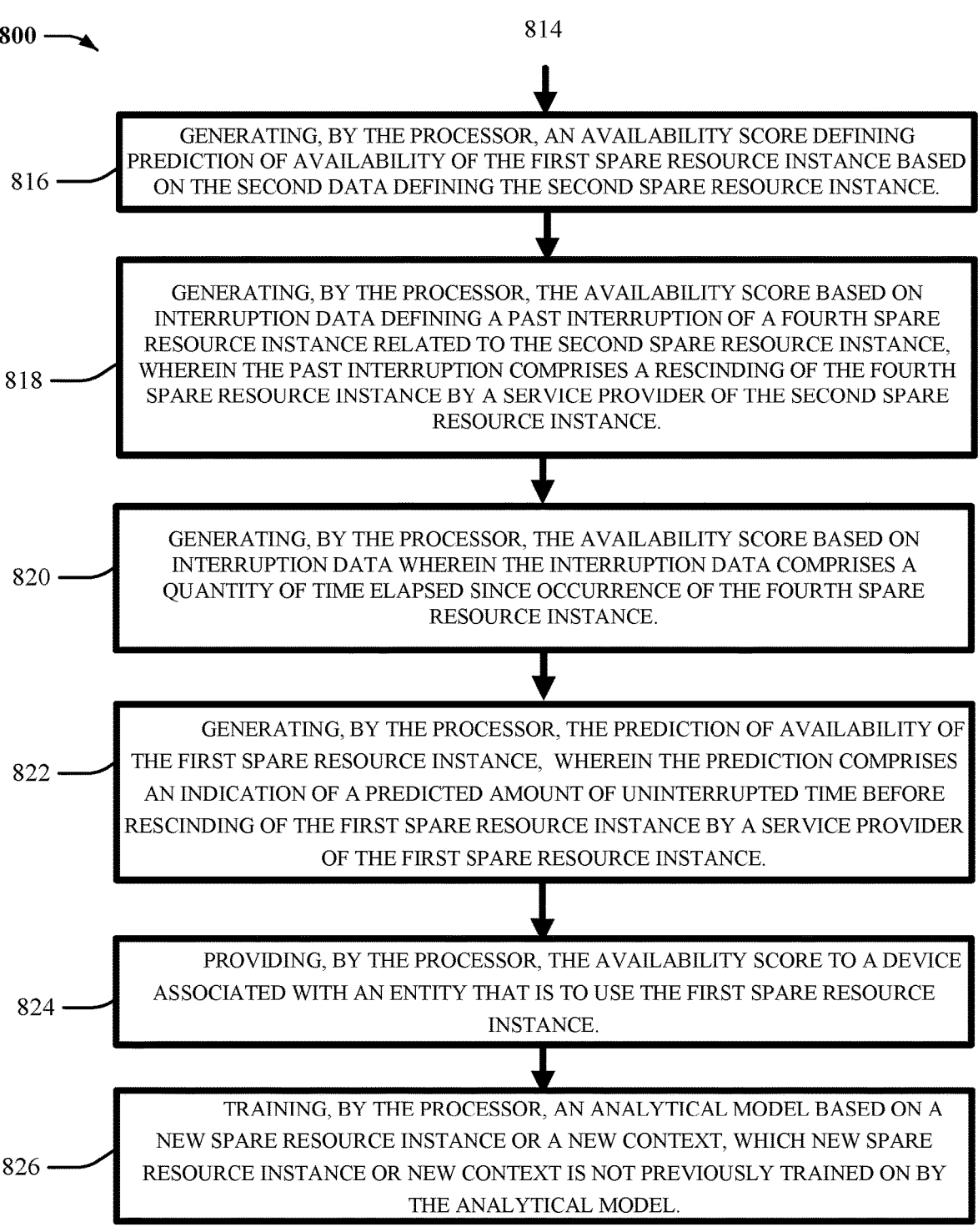

816 — GENERATING, BY THE PROCESSOR, AN AVAILABILITY SCORE DEFINING PREDICTION OF AVAILABILITY OF THE FIRST SPARE RESOURCE INSTANCE BASED ON THE SECOND DATA DEFINING THE SECOND SPARE RESOURCE INSTANCE.

818 — GENERATING, BY THE PROCESSOR, THE AVAILABILITY SCORE BASED ON INTERRUPTION DATA DEFINING A PAST INTERRUPTION OF A FOURTH SPARE RESOURCE INSTANCE RELATED TO THE SECOND SPARE RESOURCE INSTANCE, WHEREIN THE PAST INTERRUPTION COMPRISES A RESCINDING OF THE FOURTH SPARE RESOURCE INSTANCE BY A SERVICE PROVIDER OF THE SECOND SPARE RESOURCE INSTANCE.

820 — GENERATING, BY THE PROCESSOR, THE AVAILABILITY SCORE BASED ON INTERRUPTION DATA WHEREIN THE INTERRUPTION DATA COMPRISES A QUANTITY OF TIME ELAPSED SINCE OCCURRENCE OF THE FOURTH SPARE RESOURCE INSTANCE.

822 — GENERATING, BY THE PROCESSOR, THE PREDICTION OF AVAILABILITY OF THE FIRST SPARE RESOURCE INSTANCE, WHEREIN THE PREDICTION COMPRISES AN INDICATION OF A PREDICTED AMOUNT OF UNINTERRUPTED TIME BEFORE RESCINDING OF THE FIRST SPARE RESOURCE INSTANCE BY A SERVICE PROVIDER OF THE FIRST SPARE RESOURCE INSTANCE.

824 — PROVIDING, BY THE PROCESSOR, THE AVAILABILITY SCORE TO A DEVICE ASSOCIATED WITH AN ENTITY THAT IS TO USE THE FIRST SPARE RESOURCE INSTANCE.

826 — TRAINING, BY THE PROCESSOR, AN ANALYTICAL MODEL BASED ON A NEW SPARE RESOURCE INSTANCE OR A NEW CONTEXT, WHICH NEW SPARE RESOURCE INSTANCE OR NEW CONTEXT IS NOT PREVIOUSLY TRAINED ON BY THE ANALYTICAL MODEL.

FIG. 9

SPARE RESOURCE AVAILABILITY PREDICTION WITH LIMITED HISTORICAL DATA

CROSS-REFERENCE TO RELATED APPLICATIONS

This application claims the benefit of and priority to U.S. provisional patent application Ser. No. 63/370,976, filed Aug. 10, 2022 and entitled "ADAPTIVE SPOT INSTANCE PREDICTION," the entirety of which is hereby incorporated by reference herein.

TECHNICAL FIELD

The subject disclosure relates generally to spare resource usage, and more specifically to management of access to instances, such as spot instance, of spare resource usage from service providers.

BACKGROUND

An instance of spare resource usage, or instance, as also used herein, is a limited instance of server usage and/or storage usage that can be requested and purchased from a service provider, such as a server provider and/or storage provider, often at a discount. This discount can be provided as compared to a pro-rated use, of the same time length, of a larger resource usage contract. Instances can enable an entity to request spare resource usage while remaining cost-efficient, and in turn can allow service providers to sell unused resources, such as capacity on a server, e.g., over a respective cloud. However, instances can be taken back by a service provider, often with little notice, such as for use of the resource by a full-use or full-paying entity.

SUMMARY

The following presents a summary to provide a basic understanding of one or more embodiments described herein. This summary is not intended to identify key or critical elements, delineate scope of embodiments or scope of claims. Its sole purpose is to present concepts in a simplified form as a prelude to the more detailed description that is presented later. In one or more embodiments described herein, systems, computer-implemented methods, apparatuses, and/or computer program products can facilitate a process to predict availability of a spare resource instance from one or more service providers, such as at one or more markets.

As used herein, a spare resource can be server space, server usage and/or storage space.

In accordance with an embodiment, a system can comprise a memory that stores computer executable components, and a processor that executes the computer executable components stored in the memory. The computer executable components can comprise a correlation component that, based on a first context defining a first spare resource instance to be utilized in a networked system, identifies a second spare resource instance, and an evaluation component that generates an availability score defining prediction of availability of the first spare resource instance based on a second context defining the second spare resource instance, wherein the evaluation component further deploys the first spare resource instance, based on the availability score, in the networked system.

As used herein, an "availability score" can refer to a ranked score defining a spare resource instance based on one or more contexts such as including, but without being limited to, quantity of available spare resource instances, quantity of uninterrupted time of one or more spare resource instances, likelihood of an interruption of a spare resource instance (e.g., whether a spare resource instance should be dropped and replaced prior to a likely interruption), and/or quantity of interruptions in a defined time range correlated to a spare resource instance. For example, an availability score can be based on at least one of various contexts comprising interruption data, such as time elapsed since last interruption, and/or average time between interruptions. Accordingly, an availability score can thus represent at least an aspect of interruption data having been ranked into the availability score.

In accordance with another embodiment, a computer-implemented method can comprise identifying, by a processor, a first context defining a first spare resource instance to be utilized in a networked system, evaluating, by the processor, a second spare resource instance to determine a second context defining the second spare resource instance, generating, by the processor, an availability score for predicting availability of the first spare resource instance based on the second context defining the second spare resource instance; and deploying, by the processor, the first spare resource instance, based on the availability score, in the networked system.

In accordance with yet another embodiment, a computer program product can facilitate a process to predict availability of a spare resource instance. The computer program product can comprise a computer readable storage medium having program instructions embodied therewith, the program instructions executable by a processor to cause the processor to execute operations. The operations can comprise generating, by the processor, an availability score for predicting availability of a first spare resource instance based on context defining a second spare resource instance, and deploying, by the processor, the first spare resource instance, based on the availability score, in a networked system.

As used herein, a spare resource instance can be a deployment of resources over a networked system and/or cloud system wherein the resources (e.g., spare resources to a service provider of the resources) can be provided, and/or access to the resources provided, by a service provider (e.g., a computer, server, software application, machine, device, server system, storage system, cloud system and/or application system), such as by an administrator node and/or controller of, operably coupled to and/or associated with such service provider. The resources can comprise, without being limited to, a computer, server, software, software application, machine, device, server usage, server space and/or storage space. Thus, for example, a spare resource instance can be at least partially deployed at one end of a network by a device associated with a user entity, and at another end of a network (e.g., operably connected to the one end) by the service provider, over and/or in a networked system.

As used herein, a spare resource instance can be one of a subset of spare resource instances being offered. Thus, reference herein to context of and/or defining a spare resource instance likewise can refer to context of and/or defining a subset of spare resource instance comprising the spare resource instance.

As used herein, a spare resource instance can be provided, hosted, access provided for and/or at least partially deployed by a service provider (e.g., a computer, server, software application, machine, device, server system, storage system, cloud system and/or application system), such as by an administrator node and/or controller of, operably coupled to and/or associated with such service provider. Such service provider can be associated with a subset of service providers, also herein referred to as a "market." Accordingly, reference herein to data and/or context of and/or defining a spare resource instance likewise can refer to context of and/or defining a service provider, a subset of such service providers comprising the service provider, and/or a market. Put still another way, a subset of one or more spare resource instances can define a market.

As used herein, a subset of spare resource instances can refer to a subset of one or more spare resource instances.

An advantage of any one or more of the aforementioned system, computer program product and/or computer-implemented method can be an ability to compute availability metrics for unknown subsets of one or more spare resource instances, including new, unpopular, newly popular and/or rare subsets spare resource instances. That is, for an unknown subset of spare resource instances for which low or even no spare resource instance interruption data is available, identifiable and/or offered, one or more correlations can be drawn between such unknown subset of spare resource instances and at least one known subset of spare resource instances for which greater information, including spare resource interruption data, is known (e.g., available, identifiable and/or offered).

For example, an identifiable second amount of second data defining a second spare resource instance (e.g., known) can be greater than an identifiable first amount of first data defining a first spare resource instance (e.g., unknown). In this way, the second data of the second spare resource instance, being correlated to the first spare resource instance, can be employed to identify and/or predict availability of the first spare resource instance. The first data and the second data each can comprise one or more contexts defining the respective spare resource instances.

For another example, in view of the reference above to a "market", an identifiable second amount of second data defining a second market, subset of spare resource instance, service provider and/or subset of service providers (e.g., known) can be greater than an identifiable first amount of first data defining a first market, subset of spare resource instances, service provider and/or subset of service providers (e.g., unknown).

Another advantage of any one or more of the aforementioned system, computer program product and/or computer-implemented method can be ability of an entity to obtain a spare resource instance that can be employed for a longer uninterrupted time as compared to existing spare resource instance determination frameworks. Indeed, the one or more frameworks provided herein can enable an entity to be provided with more efficient use of available spare resource instances, such as by having a better understanding of available uninterrupted timing of such spare resource instances.

Yet another advantage of any one or more of the aforementioned system, computer program product and/or computer-implemented method can be an ability to balance time and/or resources for switching spare resource instances ahead of a predicted interruption of a current spare resource instance. This can be desired as compared to an alternative of being notified with short notice of spare resource instance recovery (e.g., rescinding) by a service provider, which in turn can cause the launch of a new spare resource instance out of the blue to continue the entity's work at the new spare resource instance.

Still another advantage of any one or more of the aforementioned system, computer program product and/or computer-implemented method can be a practical application of data, such as realtime and/or historical data, to help better inform a user entity (and/or a device associated with and/or used by a user entity) in making a decision for deploying an unknown spare resource instance, for which there is low availability of data than for other, known spare resource instances or one or more subsets of spare resource instances.

Another advantage of any one or more of the aforementioned system, computer program product and/or computer-implemented method can be self-improvement of the system such as by continually training analytical models employed by the system, at a suitable frequency. The analytical models can be employed generate the availability score. Due to the updating, subsequent iterations of use of the system can be made more accurate and/or efficient. That is, the system can improve itself over time.

In one or more embodiments, the analytical models can be updated based on realtime data determined after communication of an availability score. The update can be performed based on a number of false positive or false negative predictions, which information can be employed, to adjust one or more threshold employed by the analytical models in generating the availability scores. Due to such updating, subsequent iterations of use of the system can be made more accurate and/or efficient. That is, the system can improve itself over time.

In one or more embodiments, the correlation component further can generate a correlation score defining a correlation between the first spare resource instance and the second spare resource instance, wherein the correlation score can be employed by the evaluation component to generate the availability score. An advantage of this feature can be an ability to compare correlation scores of various spare resource instances with the first spare resource instance, such as to determine a highest correlation score. In this way, data from a spare resource instance having available data, as compared to the low or unavailable data of the first spare resource instance, can be employed by the system for selecting the first an available spare resource instance and/or predicting availability, such as amount of uninterrupted time before rescinding, of the first spare resource instance.

DESCRIPTION OF THE DRAWINGS

FIG. 2 illustrates a block diagram of another example, non-limiting system that can facilitate a process to predict availability of a spare resource instance, in accordance with one or more embodiments described herein.

FIG. 4 illustrates a block diagram of example contexts for use by a spare resource instance prediction system, in accordance with one or more embodiments described herein.

FIG. 5 depicts a Venn-diagram of contexts that can be employed by a spare resource instance prediction system, in accordance with one or more embodiments described herein.

FIG. 6 also depicts a table of data that can be employed to train an analytical model that can be used by a spare resource instance prediction system, in accordance with one or more embodiments described herein.

FIG. 8 depicts a block-based flow diagram of processes for predicting availability of a spare resource instance, in accordance with one or more embodiments described herein.

FIG. 9 depicts a continuation of the block-based flow diagram of FIG. 8 of processes for predicting availability of a spare resource instance, in accordance with one or more embodiments described herein.

DETAILED DESCRIPTION

Figure 1:
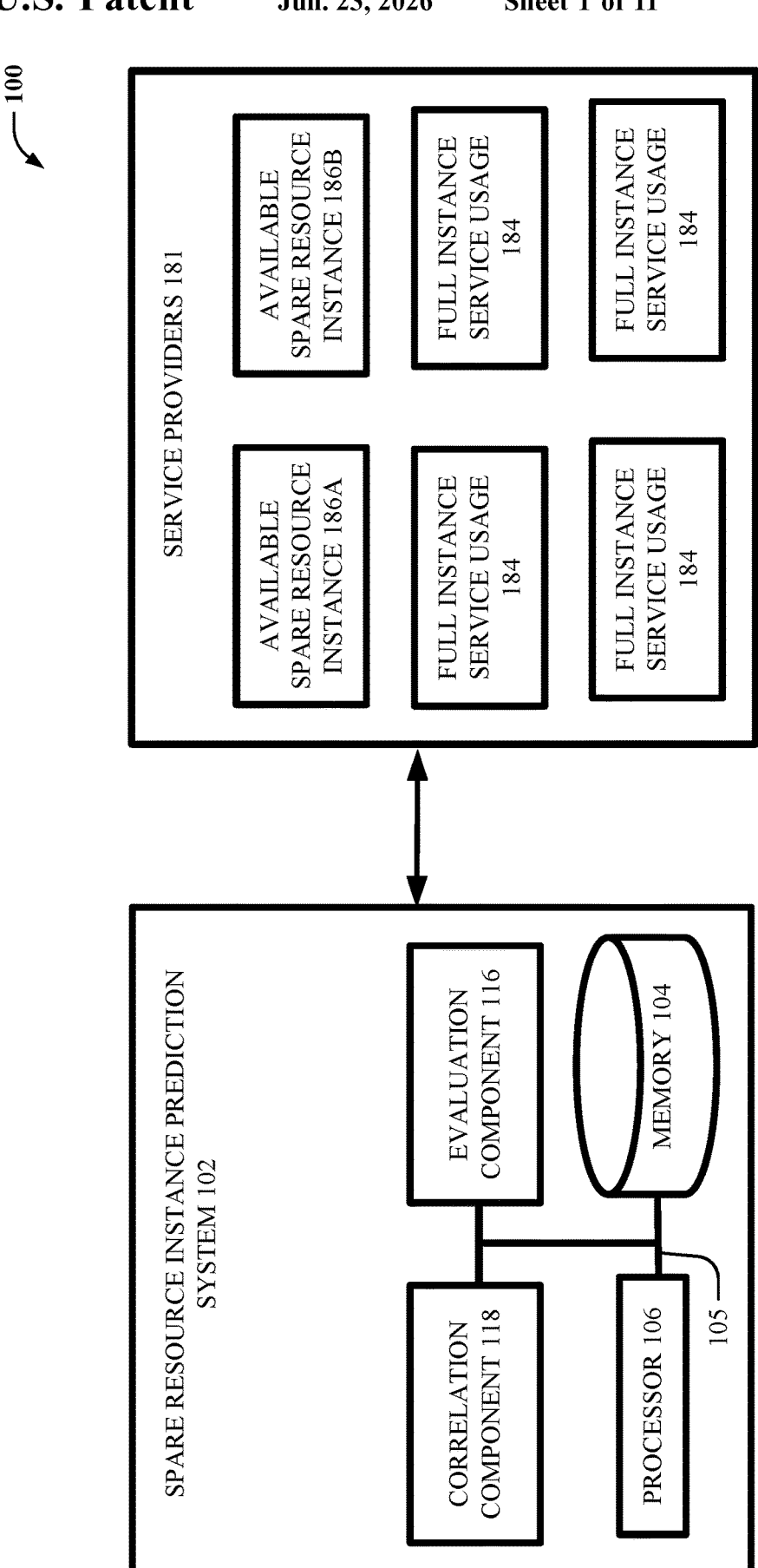
FIG. 1 illustrates a block diagram of an example, non-limiting system that can facilitate a process to predict availability of a spare resource instance, in accordance with one or more embodiments described herein.

Generally, user entities that purchase and/or request reserved and/or on-demand resources from a service provider have priority over user entities that request non-reserved spare resource. These resources can comprise, without being limited to, server space, server usage and/or storage. The non-reserved spare resource usages can be referred to as spare resource instances, also herein referred to as instances.

These spare resource instances can comprise spot instances (e.g., for server usage). A spot instance can represent an instance of unused server capacity. The term "spot" can refer to an instance that is "out of the blue" or sandwiched between larger server usages, such as full-paying server usages. Notably, this "spot" terminology can generally refer to any spare resource usage that is "out of the blue" or sandwiched between reserved resource usages.

Further, while description herein above and below refers to "spare" resource usage, the one or more frameworks described herein also are applicable to and can comprise resources offered by a service provider associated with a service entity by default in short or small time ranges that can be interrupted. Accordingly, as used herein, "spare resources" can comprise such short-term resource usages that may be other than merely left-over resources.

Indeed, because a service provider can function to maximize usage of its product (e.g., server/cloud availability), a spare resource instance for a discreet period of service usage can be offered at a reduced price, such as a 90% reduced price. However, such lower price can come with one or more downfalls. In one or more cases, spare resource instances cannot be guaranteed to be available upon request. That is, a request can be denied. In addition, a spare resource instance can be taken back by the service provider with short notice, such as a notice of two minutes or less. This procedure of taking back (e.g., rescinding) a spare resource instance is defined as an instance interruption. The service provider can function to take back the spare resource instance to use the available service capacity for a full paying entity, for example.

Accordingly, while a spare resource instance can provide a cost-efficient method of obtaining service capacity, a user entity should be flexible about what applications should be run on a spare resource instance, when applications should be run, and if applications can be interrupted, for example. Indeed, spare resource instances can be suitable for various applications including, without be limited thereto, data analysis, batch jobs, background processing, short-term storage, and/or optional tasks.

In addition to short-notice interruption of a spare resource instance, use of a spare resource instance can have one or more additional and/or alternative deficiencies. These can include, but are not limited to, different interruption protocols related to different spare resource instances and/or subsets of spare resource instances, different popularity, different historical interruption data, varying hardware and/or software for operating spare resource instances, varying operating parameters of spare resource instances, new spare resource instances and/or subsets of spare resource instances, and/or spare resource instances for which interruption data is not known.

As used herein, a spare resource instance can be one of a subset of spare resource instances being offered. Thus, reference herein to context of and/or defining a spare resource instance likewise can refer to context of and/or defining a subset of spare resource instance comprising the spare resource instance.

As used herein, a subset of spare resource instances can refer to a subset of one or more spare resource instances.

As used herein, a "market" can refer to a group of one or more regions, such as of a country, state and/or county. Each region can have one or more areas or zones. Each area or zone can have one or more service providers, and thus each region can have a plurality of service providers and/or a machine and/or computer device associated with such service providers. Indeed, each market likewise can have a plurality of service providers.

New spare resource instances, service providers and/or markets can pop up, be generated and/or be formed on a rapid basis. This can currently be due, for example, to a rapidly expanding desire by entities for additional service capacity, such as offsite service capacity (e.g., offsite from the entity, such as offered via one or more cloud applications).

In connection with the above, existing frameworks for analyzing and providing information to user entities about spare resource instances are unable to provide and do not provide information related to interruptions of available spare resource instances. At most, such existing frameworks can provide, such as in response to a respective application programming interface (API) call, information regarding what spare resource instances are available and/or a success rate of whether any spare resource instance is available when a spare resource instance is requested to be used.

To account for one or more of these deficiencies of existing frameworks and/or for one or more issues with understanding unknown spare resource instances, one or more systems, computer-implemented methods and/or computer program products are described herein that can be employed by an entity to predict spare instance availability for one or more spare resource instances. In one or more embodiments, artificial intelligence can be employed to predict availability of a spare resource instance, such as by identifying, analyzing, comparing, correlating and/or aggregating various contexts defining various spare resource instances.

In one or more embodiments, such spare resource instances (and thus markets comprising spare resource instances) can be known (e.g., already at least partially defined and/or popular) and/or unknown (e.g., not yet known, unpopular, just becoming popular, rare and/or for which very little context is known as compared to a known spare resource instance). For example, a known spare resource instance can be related to a market/service provider have been in operation for an extended time, such as years, while a new spare resource instance can be related to a market/service provider having been operating for mere months or even days. Differently, an unknown spare resource instance can be new or can be unpopular, and thus data may not be available and/or can be low for such spare resource instances. In such cases, use of historical interruptions can fail and/or be less accurate and/or precise, at least in part because such historical data can be unavailable or limited.

As used herein, the term "unknown" spare resource instance can refer to a new spare resource instance, an unpopular spare resource instance, a rare spare resource instance or a spare resource instance for which data may not be available and/or can be low for any suitable reason.

As used herein, a "rare" spare resource instance can be one that is not often offered.

As used herein, an "unpopular" spare resource instance can be one which is used less than popular spare resource instances. Thus, for example, a spare resource instance can be unpopular due to less usage of a service and/or service provider as compared to another known spare resource instance.

As used herein, a "popular" spare resource instance can be one that is used more than others, and thus is a known spare resource instance.

A challenge to the analysis of contexts defining an unknown spare resource instance can be an absence of historical data (e.g., which can comprise metadata) for a spare resource instance, such as where a new spare resource instance can come into use by clients of spare resource instances. This can limit the ability to use artificial intelligence (AI) to predict spare resource instance availability and spare resource instance interruption.

Indeed, spare resource instances comprising unused resource capacity, hence "spare" resource instances, can number in the tens of thousands. In one or more cases, when historical data is not available for a spare resource instance, the one or more frameworks discussed herein can aim to identify, and thus correlate to, one or more known spare resource instances with similar context, such as where data is known. Indeed, historical data for known spare resource instances, and even short-term data for unknown spare resource instances, can be employed to make predictions for unknown spare resource instances where data is unknown or less known.

As used herein, a context can comprise any data that defines a spare resource instance, such as, but not limited to, quantity of interruptions, quantity of spare resource instances, average time of spare resource instances, spare resource instance service provider location, popularity, size, hardware and/or software used, and/or services available.

To account for the aforementioned challenge of unavailable spare resource instance contexts, one or more frameworks are provided herein. The frameworks generally can be described as including determination of one or more contexts defining a spare resource instance request, determination of one or more contexts defining one or more known markets, determination of one or more contexts defining one or more unknown spare resource instances, comparison of the aforementioned contexts, correlation of the aforementioned contexts (e.g., of contexts of a known spare resource instance to contexts of an unknown spare resource instance), generation of a multi-spare resource instance profile defining a plurality of such correlations, identification of spare resource instance availability, prediction of uninterrupted time of spare resource instance availability, selection of a spare resource instance to satisfy a spare resource instance request, and/or communication of data defining the one or more identifications and/or predictions to a device associated with a user entity that is to use a spare resource instance.

In one or more embodiments, one or more restrictive thresholds for one or more contexts can be assigned, such as by a user entity and/or administrator entity, thus narrowing a pool of spare resource instances and/or markets that can be predicted, correlated and/or identified. In one or more embodiments, an availability score can be generated for a spare resource instance, such as based on one or more of the aforementioned and/or additional contexts, such as on a combination of one or more contexts. In one or more embodiments, a correlation score can be generated for an unknown spare resource instance, based on high and/or low correlation to a known spare resource instance. Likewise, one or more thresholds can be assigned for the availability score and/or correlation score, such as by an entity. For example, in one or more cases, only spare resource instances satisfying a correlation threshold will be used for identification and/or prediction relative to a spare resource instance. In one or more cases, only spare resource instances having an availability score satisfying an availability threshold will be communicated to a user entity having requested and/or needing a spare resource instance.

As used herein, "satisfying" can comprise meeting and/or exceeding a threshold.

In one or more embodiments, an analytical model, such as an artificial intelligence (AI) model, machine learning (ML) model, deep learning (DL) model and/or deep neural network (DNN) can be employed. That is, such analytical model can be employed to determine patterns in spare resource instance behavior. Such analytical models can be employed for the aforementioned predictions, identifications, selections and/or correlations. For example, a retrieval model can be employed to correlate unknown spare resource instances to known spare resource instances. Inputs to such analytical models can comprise logs from various software, hardware and/or operating system environments related to service usage, markets and/or service providers. A predictive model can be employed to predict spare resource instance availability using a correlation, such as output by the retrieval model.

As used herein, "spare resource instance availability" can refer to quantity of available spare resource instances, quantity of uninterrupted time of one or more spare resource instances, likelihood of an interruption of a spare resource instance (e.g., whether a spare resource instance should be dropped and replaced prior to a likely interruption), and/or quantity of interruptions related to spare resource instance (and/or subset) in a defined time range.

Such analytical models can be trained and/or retrained based on both test data and training data related to historically known contexts. In one or more embodiments, retraining can be based on various realtime data obtained, such as after communicating prediction and/or spare resource identification. For example, a number of false positive or false negative predictions can be logged and employed, such as to adjust one or more threshold employed by the analytical models. A false positive can be defined as predicting a spare resource interruption when no interruption actually occurred (e.g., wrongly, positively predicting an interruption). A false negative can be defined as failure to predict one or more spare resource interruptions that occurred (e.g., wrongly negatively predicting no interruption would occur). As mentioned, one or more thresholds of allowance of incorrect interruptions predicted, such as for replacement of an existing spare resource instance, and/or of allowance of interruptions missed (e.g., not predicted) can be updated based on this realtime data, where the thresholds can be employed by the analytical models, with the analytical models being retrained on the realtime data such as to update the thresholds.

In one or more embodiments, retraining can be based on feedback input by an administrator entity, such as manual adjustment of one or more of the correlation threshold and/or availability threshold employed by the analytical models, and/or addition of one or more contexts to consideration by the analytical models.

Direction now turns to one or more embodiments for addressing one or more of the above-identified deficiencies of existing frameworks and/or lack of available data for unknown markets.

The following and above-provided detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous details are set forth in order to provide a more thorough understanding of the one or more embodiments. It is evident, however, in various cases, that the one or more embodiments can be practiced without these details.

As used herein, "cost" can refer to time, money, power, storage, memory, bandwidth and/or manual labor.

As used herein, "data" can comprise metadata and can comprise structured and/or unstructured data.

As used herein, "use" can comprise access to.

As used herein, "operating parameter" can be a key performance indicator (KPI) such as, but not limited to, degradation, bandwidth and/or service outages.

As used herein, "client" can refer to a device, network, application, virtual machine, system, machine, component, hardware, software, smart device and/or human.

As used herein, "entity" can refer to a device, network, application, virtual machine, system, machine, component, hardware, software, smart device and/or human.

As used herein, a "server" can refer to computer software and/or hardware that can provide functionality for other clients, programs or devices, and which can manage access to a centralized resource or service in a network.

The one or more embodiments are now described with reference to the drawings, where like referenced numerals are used to refer to like elements throughout. In the following description, for purposes of explanation, numerous details are set forth in order to provide a more thorough understanding of the one or more embodiments. It is evident in various cases, however, that the one or more embodiments can be practiced without these details.

Further, the embodiments depicted in one or more figures described herein are for illustration only, and as such, the architecture of embodiments is not limited to the systems, devices and/or components depicted therein, nor to any order, connection, and/or coupling of systems, devices and/or components depicted therein. For example, in one or more embodiments, the non-limiting systems described herein, such as non-limiting architectures 100 and/or 200, as illustrated at FIGS. 1 and 2, and/or systems thereof, can further comprise, be associated with and/or be coupled to one or more computer and/or computing-based elements described herein with reference to an operating environment, such as the cloud operating environment 1100 illustrated at FIG. 11. In one or more described embodiments, computer, and/or computing-based elements can be used in connection with implementing one or more of the systems, devices, components and/or computer-implemented operations shown and/or described in connection with FIGS. 1 and/or 2 and/or with other figures described herein.

Turning now generally to FIG. 1, one or more embodiments of the non-limiting architecture 100 described herein can include one or more devices, systems, and/or apparatuses that can facilitate a process to determine, e.g., predict, spare resource instance availability (e.g., at one or more markets), in accordance with one or more embodiments described herein. While referring here to one or more processes, facilitations, and/or uses of the non-limiting architecture 100, description provided herein, both above and below, also can be relevant to one or more other non-limiting systems described herein, such as the non-limiting architecture 200, to be described later below in detail.

Generally, the non-limiting architecture 100 can facilitate one or more processes to predict spare resource instance availability based on a spare resource instance request by an entity, such as a user entity. As illustrated, the non-limiting architecture 100 can comprise a spare resource instance prediction system 102 and a set of service providers 181.

The service providers 181 can be of one or more markets. The service providers 181 can have various available spare resource instances available (e.g., being offered) due to unused service capacity, such as server capacity. These spare resource instances can comprise a spare resource instance 186A and a spare resource instance 186B, both being available. The service providers 181 further can offer or already have in operation a plurality of full instances of service usage 184. Thus, with short notice, it can be understood by an entity using a spare resource instance 186A or 186B, that such spare resource instances can be taken back (e.g., rescinded) by the respective service provider 181, such as for use by a full paying entity and/or for use as capacity for an existing or new, full instance of service usage 184.

The spare resource instance prediction system 102 can be generally configured to predict spare resource instance availability, including available non-interrupted time of such spare resource instances (e.g., at one or more markets), relative to one or more service providers. Such prediction can comprise information defining one or more of the available spare resource instances 186A and 186B.

The spare resource instance prediction system 102 generally can comprise a processor 106, memory 104, bus 105, correlation component 118 and/or evaluation component 116. Communication between the one or more components of the spare resource instance prediction system 102 and the one or more service providers 181 can be by any suitable communicative medium. The memory 104 can comprise one or more computer readable instructions that can be acted upon by the processor 106 and/or one or more other components of the spare resource instance prediction system 102.

Generally, the correlation component 118 can, based on first data defining a first spare resource instance, identify a second spare resource instance. An identifiable second amount of second data defining the second spare resource instance can be greater than an identifiable first amount of the first data. That is, the first spare resource instance can be an unknown spare resource instance and the second spare resource instance can be a known spare resource instance.

The evaluation component 116 generally can generate an availability score defining prediction of availability of the first spare resource instance based on the second data defining the second spare resource instance. That is, the evaluation component 116 can generate the availability score defining prediction of availability of the unknown first spare resource instance based on data defining the known second spare resource instance. The evaluation component 116 further can provide the availability score to a device associated with an entity that is to use the spare resource instance.

That is, the spare resource instance prediction system 102 can be defined as comprising a practical application of data, such as realtime and/or historical data, to help better inform a user entity in making a decision for deploying an unknown spare resource instance, for which there is low availability of data than for other, known spare resource instances.

Turning next to FIG. 2, another non-limiting architecture 200 is illustrated. One or more embodiments of the non-limiting architecture 200 described herein can include one or more devices, systems, and/or apparatuses that can facilitate a process to request a spare resource instance and/or predict spare resource instance availability, in accordance with one or more embodiments described herein. Repetitive description of like elements and/or processes employed in respective embodiments is omitted for the sake of brevity. While referring here to one or more processes, facilitations, and/or uses of the non-limiting architecture 200, description provided herein, both above and below, also can be relevant to one or more other non-limiting systems described herein, such as the non-limiting architecture 100.

Like the non-limiting architecture 100, the non-limiting architecture 200 can comprise a spare resource instance prediction system 202 and the one or more service providers 181. Description relative to the one or more service providers 181 is not repeated here for sake of brevity.

Communication between the spare resource instance prediction system 202 and the data storage system 201 can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol, and/or other proprietary and/or non-proprietary communication protocols.

Like the spare resource instance prediction system 102, the spare resource instance prediction system 202 can facilitate one or more processes to determine spare resource instance availability, such as to identify available spare resource instances satisfying a request from a user entity, and/or predicting spare resource instance availability (e.g., including predicted time of non-interruption) that likewise can satisfy the request from the user entity. The spare resource instance prediction system 202 likewise can facilitate one or more processes to request a spare resource instance, train an analytical model and/or retrain the analytical model.

The spare resource instance prediction system 202, as illustrated, can comprise any suitable type of component, machine, device, facility, apparatus, and/or instrument that comprises a processor and/or can be capable of effective and/or operative communication with a wired and/or wireless network. All such embodiments are envisioned. For example, spare resource instance prediction system 202 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the spare resource instance prediction system 202 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The spare resource instance prediction system 202 can be associated with, such as accessible via, a cloud computing environment. For example, the spare resource instance prediction system 202 can be accessed, in one or more embodiments, using one or more cloud applications, by a user entity. The spare resource instance prediction system 202 can be associated with a cloud computing environment 1102 described below with reference to illustration 1100 of FIG. 11.

Operation of the non-limiting architecture 200 and/or of the spare resource instance prediction system 202 is not limited to performance of a single prediction relative to a single spare resource instance request. Rather, operation of the non-limiting architecture 200 and/or the spare resource instance prediction system 202 can be scalable. For example, the non-limiting architecture 200 and/or the spare resource instance prediction system 202 can facilitate plural operation performances of one or more of the above-listed types at least partially in parallel with one another. For example, one or more spare resource instance predictions can be performed at least partially in parallel with one another. One or more spare resource instance predictions can be performed based on one or more requests at least partially in parallel with one another.

Turning now to illustrated components of the spare resource instance prediction system 202, comprised can be an obtaining component 212, determination component 214, evaluation component 216, correlation component 218, predictive analytical model 220, retrieval analytical model 222, training component 224, processor 206, memory 204 and/or bus 205.

Discussion first turns to the processor 206, memory 204, and bus 205 of the spare resource instance prediction system 202.

For example, in one or more embodiments, spare resource instance prediction system 202 can comprise a processor 206 (e.g., computer processing unit, microprocessor, classical processor, and/or like processor). In one or more embodiments, a component associated with spare resource instance prediction system 202, as described herein with or without reference to the one or more figures of the one or more embodiments, can comprise one or more computer and/or machine readable, writable, and/or executable components and/or instructions that can be executed by processor 206 to facilitate performance of one or more processes defined by such component and/or instruction. In one or more embodiments, the processor 206 can comprise the obtaining component 212, determination component 214, evaluation component 216, correlation component 218, predictive analytical model 220, retrieval analytical model 222, and/or training component 224.

In one or more embodiments, the spare resource instance prediction system 202 can comprise a computer-readable memory 204 that can be operably connected to the processor 206. The memory 204 can store computer-executable instructions that, upon execution by the processor 206, can cause the processor 206 and/or one or more other components of the spare resource instance prediction system 202 (e.g., the obtaining component 212, determination component 214, evaluation component 216, correlation component 218, predictive analytical model 220, retrieval analytical model 222, and/or training component 224) to perform one or more actions. In one or more embodiments, the memory 204 can store computer-executable components (e.g., obtaining component 212, determination component 214, evaluation component 216, correlation component 218, predictive analytical model 220, retrieval analytical model 222, and/or training component 224).

Spare resource instance prediction system 202 and/or a component thereof as described herein, can be communicatively, electrically, operatively, optically and/or otherwise coupled to one another via a bus 205 to perform one or more functions of the non-limiting architecture 200, spare resource instance prediction system 202 and/or one or more components thereof and/or coupled therewith. Bus 205 can comprise one or more of a memory bus, memory controller, peripheral bus, external bus, local bus, and/or another type of bus that can employ one or more bus architectures. One or more of these examples of bus 205 can be employed to implement one or more embodiments described herein.

In one or more embodiments, spare resource instance prediction system 202 can be coupled (e.g., communicatively, electrically, operatively, optically and/or like function) to one or more external systems (e.g., a non-illustrated electrical output production system, one or more output targets and/or an output target controller), sources and/or devices (e.g., computing devices, communication devices and/or like devices), such as via a network. In one or more embodiments, one or more of the components of the spare resource instance prediction system 202 can reside in the cloud, and/or can reside locally in a local computing environment (e.g., at a specified location).

In addition to the processor 206 and/or memory 204 described above, spare resource instance prediction system 202 can comprise one or more computer and/or machine readable, writable, and/or executable components and/or instructions that, when executed by processor 206, can facilitate performance of one or more operations defined by such component and/or instruction.

Turning now to the knowledge database 228, this storage medium can store context of one or more spare resource instances, subsets of spare resource instances, service providers, markets, and/or entities using spare resource instances in any suitable form, such as logs, matrices and/or lists as structured or unstructured data. It is noted that in one or more embodiments, the knowledge database 228 can be internal to the spare resource instance prediction system 202, instead of separate from, and thus external to, the spare resource instance prediction system 202, as illustrated at FIG. 2. Likewise, plural knowledge databases can be employed by the spare resource instance prediction system 202, with one or more knowledge databases being comprised by the spare resource instance prediction system 202 and/or separate from the spare resource instance prediction system 202.

Turning next to the obtaining component 212, the obtaining component 212 can locate, find, search, receive and/or otherwise obtain a request for a spare resource instance, such as from an entity, and/or a notice of spare resource instance interruption, such as from a service provider 181. The obtaining component 212 likewise can locate, find, search, receive and/or otherwise obtain logs and/or other data (e.g., including metadata) from one or more user entities, service providers and/or markets for use by one or more other components of the spare resource instance prediction system 202.

The determination component 214 can generally identify one or more various types of contexts (e.g., data/metadata) for use by another component of the spare resource instance prediction system 202 in making a prediction of a spare resource instance to satisfy the request (and/or to account for the notice by an automatically generated or manually generated request). The identification can be made via any suitable search and/or data extraction framework and/or method, such as being received from the obtaining component 212.

The determination component 214 can identify context defining a request, an entity, service provider 181, known spare resource instance and/or unknown spare resource instance.

Figure 3:
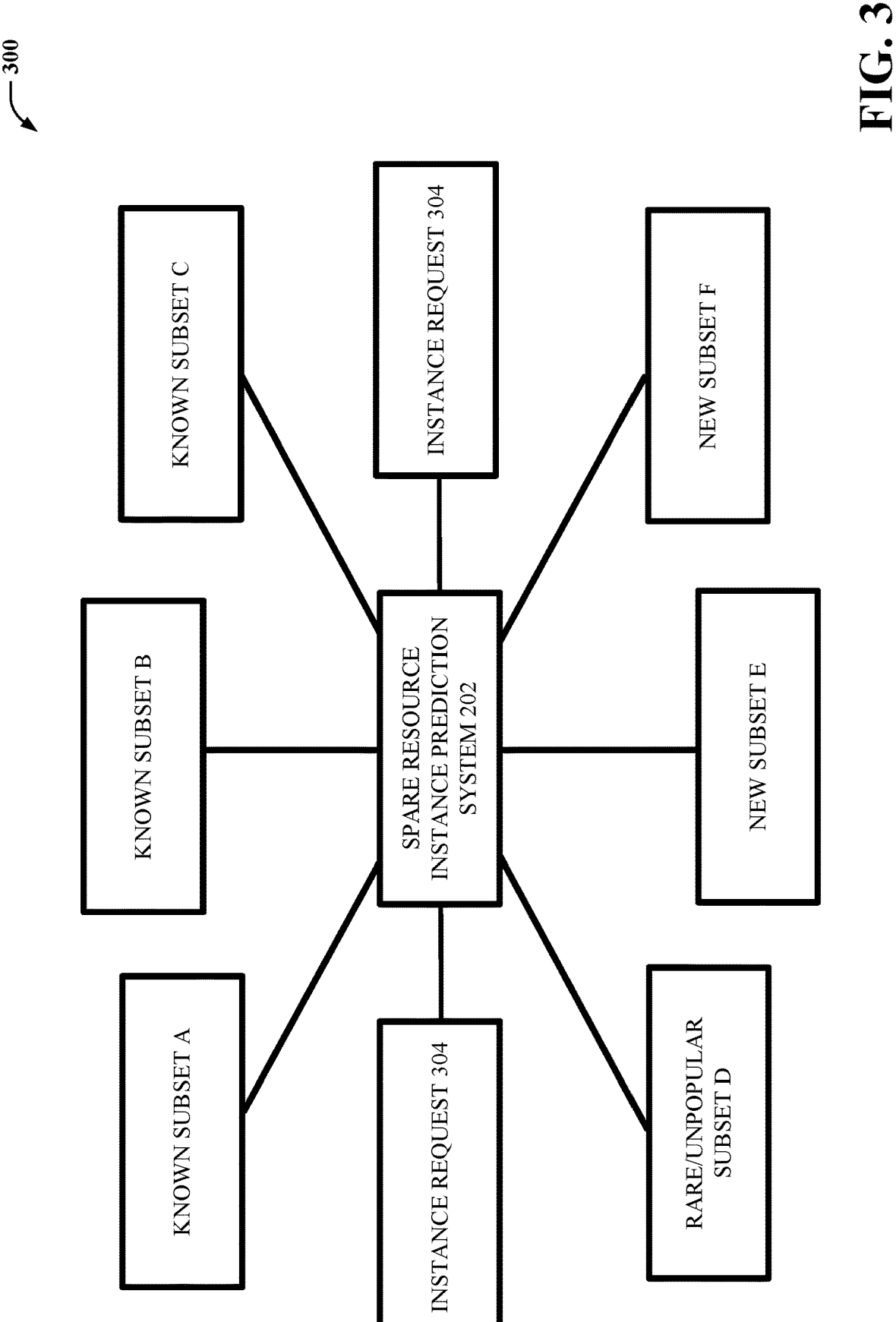
FIG. 3 illustrates a block diagram of an example, non-limiting architecture including a spare resource instance prediction system, in accordance with one or more embodiments described herein.

Turning briefly to FIG. 3, in addition still to FIG. 2, contexts of one or more spare resource instances (e.g., spare resource instance contexts) can be evaluated by the spare resource instance prediction system 202, to satisfy a spare resource instance request 304 (see, e.g., the diagram 300 of FIG. 3). A request 304 can be for any spare resource instance, a known spare resource instance, a rare/unpopular spare resource instance and/or a new spare resource instance. As shown, available spare resource instances and/or subsets of one or more spare resource instances can include known subsets (e.g., known subsets A-C), new subsets (e.g., new subsets E and F), and/or a rare/unpopular subset (e.g., rare/unpopular subset D). That is, subsets D-F can be unknown subsets. In an example, known subset A might be serviced by a hyperscaler, which is a term that can refer to an owner/operator of a data center of large size and/or extent.

The request 304 for the spare resource instance can be sent, transmitted and/or otherwise communicated to the spare resource instance prediction system 202, such as via a cloud computing environment. The request 304 can comprise a request for a new spare resource instance and/or a request for a replacement of an existing (e.g., already deployed) spare resource instance. For example, the user entity and/or the spare resource instance prediction system 202 can have received a notice of interruption from a service provider, relative to a spare resource instance already in use.

Alternatively, a request 304 need not specify a spare resource instance, or even that a spare resource instance be known or unknown. Rather, the request 304 can specify one or more other request contexts.

That is, turning now to FIG. 4, in addition still to FIGS. 2 and 3, in one or more cases, the request context from and/or defining a request 304 can be varied (e.g., including one or more contexts). Context defining a request (e.g., request context) can be determined from the request, such as by the determination component 214. The request context can originate with the request 304 and/or by comprised by the request 304, such as a result of direct input from an entity. Additionally, and/or alternatively, term identification or other suitable methods can be employed by the determination component 214 to identify request contexts from information of and/or associated with the request 304.

Examples of request contexts 410 are listed at FIG. 4, although request contexts can include fewer and/or additional types in any one or more embodiments. The request context examples can comprise interruption allowance (e.g., if an application can be interrupted, such as due to rescinding of a spare resource instance by a service provider), minimum time use (e.g., time needed for operating or executing an application without interruption), time range for use (e.g., what time of day, week, month and/or year, the spare resource instance is to be used), cost maximum threshold (e.g., what cost an entity is willing to pay for a spare resource instance and/or unit of measure of a spare resource instance), operating parameters (e.g., KPIs such as bandwidth and/or degradation data), hardware requirements, software requirements, and/or operating system requirements.

As indicated above, the determination component 214 further can determine contexts of unknown or known spare resource instances, e.g., spare resource instance contexts. The contexts can be in the form of log data that can be obtained by the obtaining component 212 from a software and/or operating system of a service provider 181 of the spare resource instance, from a logging component associated with the spare resource instance prediction system 202 (e.g., that dynamically logs real time data such as interruptions as they occur for observed spare resource instance), from the knowledge database 228 (e.g., containing historical context for one or more spare resource instances), and/or from any other suitable source. The contexts can be determined for use by one or more other components of the spare resource instance prediction system 202, relative to a request, by the determination component 214. These contexts, as will be explained below, can be used by the correlation component 218, for example, to correlate unknown spare resource instances to known spare resource instances and/or by the evaluation component 216 to identify available spare resource instances, such as by comparing contexts to the aforementioned request contexts.

Examples of contexts 420 are listed at FIG. 4, although contexts can include fewer and/or additional types in any one or more embodiments. The context examples can comprise historical operating parameters (e.g., KPIs such as bandwidth, degradation and/or server capacity), which can be aggregated by and/or stamped by any suitable unit of measure such as time, type, service provider, market, market location and/or location from which a spare resource is offered), current operating parameters (e.g., those of more recent application), hardware requirements, software requirements, operating system requirements, market location (e.g., in a country, state and/or county), distance between markets and/or spare resource offerings, market pricing (e.g., per spare resource instance and/or per unit of spare resource instance), and/or known recent interruptions and/or frequency of such known recent interruptions (such as including time lapse since occurrence of a most recent interruption of a spare resource instance).

Additional and/or alternative contexts can comprise popularity, most used parts of a time unit (e.g., times of a day) and/or number of spare resource instances available.

In one or more embodiments, request context data and/or context data can comprise a timestamp, logical drive address, actual drive address, data size, data and/or metadata.

Turning now to the correlation component 218 of FIG. 2, generally, unknown and known spare resource instances can be correlated to one another, to provide for greater availability of data for use by the evaluation component 216 in identifying available spare resource instances and/or in predicting interruptions and/or uninterrupted time of such available spare resource instances, all for satisfying a request such as the spare resource instance request 304.

It is first generally noted that the correlation component 218 can perform one or more correlation processes between unknown and known spare resource instances for one or more of various purposes. Such purposes can comprise ultimately building a profile correlating a plurality of spare resource instances to one another. Another purpose can comprise accounting for an instance request for a unknown spare resource instance (e.g., for which little data is available for which to be used by the evaluation component 216). For example, one or more unknown spare resource instances can be analyzed to determine the best spare resource instance (e.g., of a set of plural spare resource instances—known and/or unknown) to satisfy a request for a spare resource instance.

Still another purpose can be to provide a correlation in response to any other request for correlation, such as by an administrating entity, user entity, and/or a component of the spare resource instance prediction system 202, such as in response to an identification of a new spare resource instance and/or an increase in popularity of a previously unpopular spare resource instance.

For example, in one or more embodiments, a component of the spare resource instance prediction system 202 can monitor for new spare resource instances, such as on a scheduled frequency. Newly located spare resource instances can be correlated to known spare resource instances at a predetermined frequency. That is, such correlation can be automatically initiated absent connection and/or correspondence to a request for a spare resource instance.

Furthermore, as indicated above, while new spare resource instances continue to be developed and brought into operation, availability of unknown spare resource instances can, in some cases, eclipse availability of known spare resource instances, thus causing a need for the correlation provided by the correlation component 218. In this way, use of the aforementioned contexts can allow for understanding, and prediction relative to, the unknown spare resource instances for which little to no data, and thus little to no contexts, are available.

Accordingly, relative to any of the aforementioned purposes, based on first data defining a first spare resource instance, the correlation component 218 can identify a second spare resource instance, such as where an identifiable second amount of second data defining the second spare resource instance can be greater than an identifiable first amount of the first data. That is, the first spare resource instance can be an unknown spare resource instance for which few contexts can be determined, such as by the determination component 214, and the second spare resource instance can be a known spare resource instance for which a greater quantity of contexts can be determined, such as by the determination component 214. As such, based on data from the unknown spare resource instance, a known spare resource instance can be identified that correlates to the unknown spare resource instance.

More particularly, the correlation component 218 can employ contexts from unknown spare resource instances and contexts from known spare resource instances to generate one or more correlation scores defining correlations between unknown and known spare resource instances. Correlation scoring can be based on any one or more context types (e.g., context types), such as those illustrated at FIG. 4 (e.g., spare resource instance contexts 420).

In one or more embodiments one or more contexts can be weighted differently that one or more other contexts, thus making one or more contexts more significant to correlation scoring than one or more other contexts. The weighting can be controlled by an administrator entity, for example.

Additionally and/or alternatively, such contexts can be increased/decreased in weight based on continued request of such contexts by the entity, such as with the change in weighting being performed by the correlation component 218.

One or more examples are now set forth to illustrate generation of one or more correlation scores by the correlation component 218.

Various methods can be suitable for determining the correlation score.

In one example, the only data known (e.g., the only context available) for an unknown spare resource instance can be spare resource instance location, distance to other spare resource instance, and/or one or more services provided. Thus, to aid the spare resource instance prediction system 202 and the requesting entity, the unknown spare resource instance can be correlated, for example, to known spare resource instances, such as being offered by service provider having, comprised by and/or associated with a device, computer and/or machine located near the unknown spare resource instance, having same and/or similar configuration. That is, one or more contexts can be identified for use in any one correlation, where meeting one or more specified thresholds for one or more such contexts can allow for provision of a correlation score.

In another example, an algorithm and/or equation can be employed where one or more certain contexts can be provided with certain weightings for use in such algorithm and/or equation.

In still another example, the correlation component 218 can identify one or more contexts repeatedly requested by an entity and can employ those contexts in a future correlation.

Figure 6:
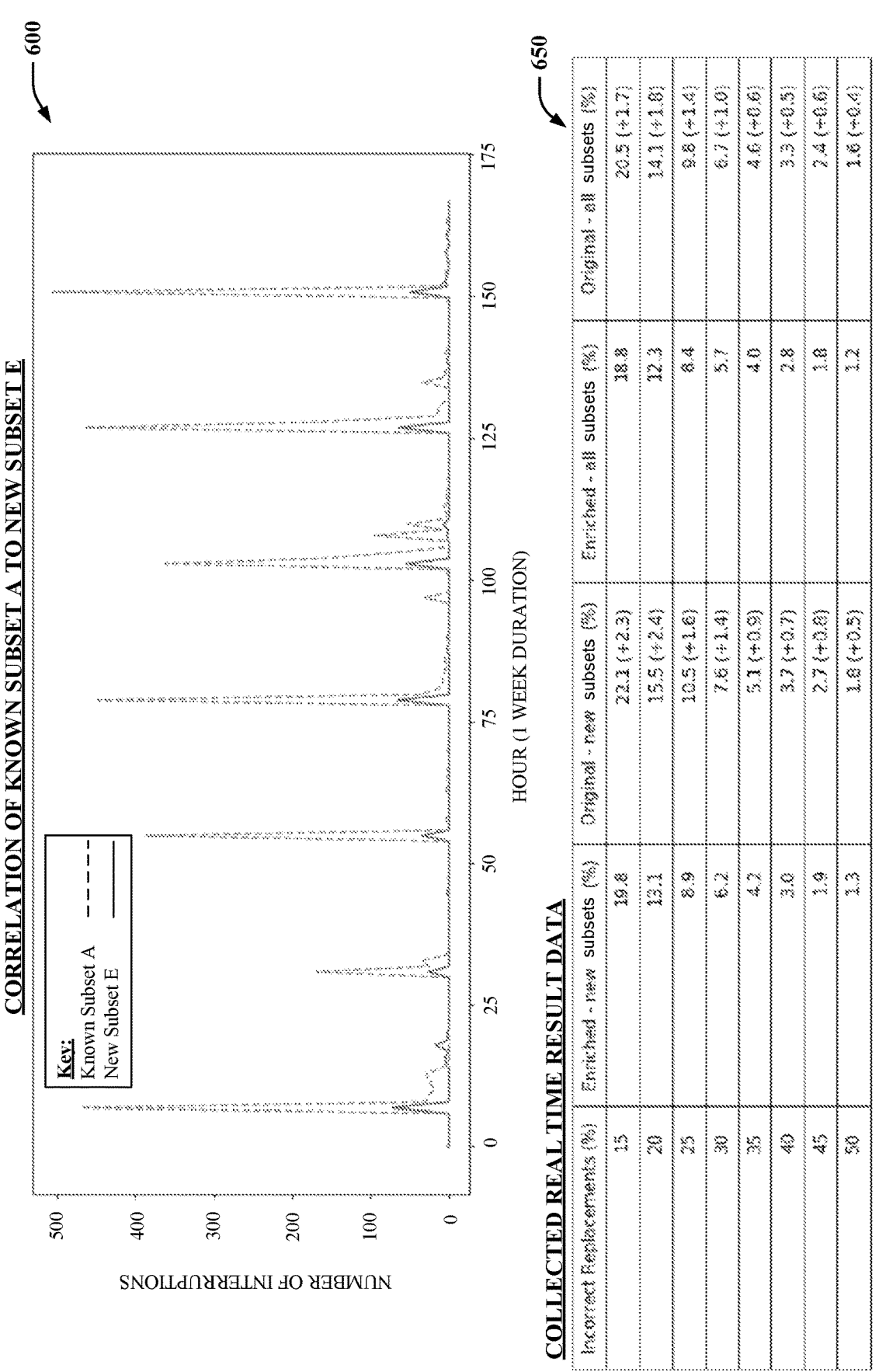
FIG. 6 depicts a graph of correlation of a pair of service providers, subsets of service providers and/or markets that each provide spare resource instances, in accordance with one or more embodiments described herein.

To illustrate yet another example, reference now turns to FIGS. 5 and 6, in addition to still referring to FIG. 2.

FIG. 5 illustrates a Venn-diagram 500 depicting correlation of new subset E and known subset A (e.g., from FIG. 4) to one another. It is appreciated that the diagram 500 is for illustration purposes only and does not have to be generated by the correlation component 218 and/or otherwise displayed to the user entity. However, in one or more other embodiments, such diagram and/or other visual aid can be generated, such as to demonstrate explainability for a correlation score, where such diagram and/or visual aid can be communicated to a user entity along with subsequent spare resource instance availability and predictions.

At diagram 500, known contexts for new subset E comprise short-term interruption data and short-term operating parameter data. Known contexts for known subset A, differently, comprise historical (e.g., longer term) interruption data and historical (e.g., longer term) operating parameter data. The interruption data and the operating parameter data can be determined to correlate, such as where known subset A can receive a high correlation score relative to new subset E.

It is noted that correlation scores can be provided using any suitable units and/or range. For example, in one or more embodiments, correlation scores provided by the correlation component 218 can range between 0.0 and 1.0.

Turning to FIG. 6, a graph 600 is depicted, differently illustrating correlation of new subset E (solid line) to known subset A (dashed line). Graph 600 illustrates number of interruptions (y-axis) of each of the known subset A and new subset E, as tracked per hour (x-axis), for a total 1 week duration.

In an embodiment, the graph 600 can be generated from a data set comprising rows of data each comprising a feature of the two subset (A and E) and a respective Pearson correlation coefficient. For example, for the feature of interruption data, a correlation can be computed by relating interruptions time ranges to one another.

As shown, based on Pearson's coefficient, despite the differences in number of iterations at ay given hour, the two subsets A and E are highly correlated. Put another way, although being two separate subsets A and E with differing numbers of interruptions, the interruptions occur at similar times (e.g., similar frequency) for each of subset A and subset E. That is, the two subsets can be determined to correlate, such as by the correlation component 218 based on the times of interruptions/frequency of interruptions. In other words, it can be reasoned that for new subset E, if more data were available, and/or were new subset E more popular for use, numbers of interruptions might increase, but frequency of interruptions may remain the same.

Indeed, in one example, a percentage of interruptions, over the 1 week, can occur at same and/or similar times (e.g., based on the Pearson correlation coefficient) and thus can satisfy (e.g., meet and/or not exceed) a threshold for correlated percentage of interruptions.

As noted above, different thresholds can be employed for different contexts.

Based on the degree of matching of the interruption frequency, for example, a correlation score can be determined to be high for the pair of known subset A and unknown (e.g., new) subset E. In one embodiment, such correlation score based solely on interruption frequency might be 0.9, for example, on a scale of 0.0 to 1.0.

Differently, it is noted that if a correlation score for the pair of known subset A and unknown subset E were to be based on a context of interruption quantity, a correlation result might be different. For example, the correlation score might be much lower. However, such context would not be a good indicator of spare resource instance correlation since known subset A might be popular and unknown subset E might be unpopular, and thus because of less usage, simply may have fewer interruptions associated with unknown subset E.

In one or more other embodiments, a correlation score for the pair of known subset A and unknown subset E can be based on one or more different and/or additional contexts.

Additionally and/or alternatively, in one or more embodiments, the correlation component 218 can aggregate contexts for a plurality of spare resource instances and/or subsets thereof (e.g., known and/or unknown). For example, interruption frequency context and/or interruption quantity context can be employed, among other contexts to generate a correlation score for plural pairs of spare resource instances and/or subsets thereof, such as for each combination of two spare resource instances in a group of spare resource instances being analyzed.

The aggregated data can be employed to generate a multi-spare resource instance profile (also herein referred to as a profile), which in turn can be employed to generate future correlation scores related to future requests for spare resource instances. In one or more embodiments, a profile can comprise a group of a plurality of spare resource instances (e.g., known and unknown) which can be related to one another by relationships between many, and such as between all, possible pairs of spare resource instances of the group of spare resource instances. In an example, each spare resource instance and/or subset thereof can be represented by a node, with node edges defining relationships between the nodes.

In one or more embodiments, such profile can be accessed by the correlation component 218 in response to receipt of a request 304, such as where one or more correlation scores have already been calculated.

Indeed, whether or not such profile is employed, the correlation component 218 can output, such as to the evaluation component 216, a set of correlation scores and/or an indication of a known spare resource instance that best correlated to an unknown spare resource instance. For example, the determined known spare resource instance can have a correlation score with a specified unknown spare resource instance that is higher than correlation scores of other known spare resource instances with the unknown spare resource instance.

That is, a result of the one or more processes performed by the correlation component 218 can comprise an indication of the known spare resource instance that best correlates to an unknown spare resource instance. The unknown spare resource instance can be one that was requested by the user entity, one that has a context that was requested by the user entity, and/or the unknown spare resource instance can be one of plural unknown spare resource instance that are being analyzed by the correlation component 218 for being able to provide resultant correlation scores to the evaluation component 216.

Turning now to an additional and/or optional component of the spare resource instance prediction system 202, to aid in generating the profile, and/or to aid in generating correlation scores, the correlation component 218 can employ and/or comprise an analytical model, such as the retrieval analytical model 222. The retrieval analytical model 222 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the retrieval analytical model 222 can comprise a machine learning (ML) model that can be trained on historical data of one or more markets, requests, entities using spare resource instance and/or service providers.

For example, the retrieval analytical model 222 can receive and/or obtain, as an input, available contexts that can be identified by the determination component 214 for spare resource instances, such as known and unknown spare resource instances identified by correlation component 218. Based on the one or more of the contexts, the retrieval analytical model 222 can correlate spare resource instances to one another by calculating and then assigning correlation scores. In one or more embodiments, the retrieval analytical model 222 can be employed to aggregate contexts of a plurality of known spare resource instances, and can generate one or more relationships between spare resource instances, such as based on correlation scores based upon different contexts.

Turning next to the evaluation component 216, the component can generally identify one or more available spare resource instances that can satisfy the request 304 and/or can generate an availability score for the one or more available spare resource instances, which availability score can define a prediction of availability of the spare resource instance.

As mentioned above, an "availability score" can refer to a ranked score defining a spare resource instance based on one or more contexts such as including, but without being limited to, quantity of available spare resource instances, quantity of uninterrupted time of one or more spare resource instances, likelihood of an interruption of a spare resource instance (e.g., whether a spare resource instance should be dropped and replaced prior to a likely interruption), and/or quantity of interruptions in a defined time range correlated to a spare resource instance. For example, an availability score can be based on at least one of various contexts comprising interruption data, such as time elapsed since last interruption, average time between interruptions. Accordingly, an availability score can thus represent at least an aspect of interruption data having been ranked into the availability score.

More particularly, based on one or more of the request context of the request 304, such as determined by the determination component 214, the evaluation component 216 can identify one or more available spare resource instances. For example, the evaluation component 216 can compare one or more request contexts defining the request 304 to one or more contexts defining one or more known and/or unknown spare resource instances.

In one or more embodiments, a request context can comprise a operating system, software requirement, hardware requirement and/or market region. In one or more embodiments, a request context can comprise a spare resource instance, subset, service provider and/or market. For unknown spare resource instances, the evaluation component 216 can employ the contexts of known spare resource instances, e.g., those of known spare resource instances that have been identified as best correlated to the unknown spare resource instances by the correlation component 218 (e.g., those known spare resource instances having the highest correlation scores with respective unknown spare resource instances as determined by the correlation component 218).

In one or more embodiments, one or more request contexts can be weighted to signify greater importance. This weighting can be performed by a user entity and/or by an administrator entity. In one or more embodiments, the weighting can be based on default settings of the spare resource instance prediction system 202. In one or more embodiments, the evaluation component 216 can apply, determine and/or modify one or more request context weightings based on historical data and/or user entity data. For example, a user entity can continue to identify one or more request contexts, thus indicating the importance of the one or more request contexts to the user entity. As such, request context weightings can be dynamically determined, such as relative to different requests 304 and/or different user entities.

Additionally and/or alternatively, the evaluation component 216 can generate an availability score for one or more identified available spare resource instances, which individual availability scores each can define a prediction related to one of the spare resource instances.

Generally, the evaluation component 216 can generate an availability score defining prediction of availability of a first spare resource instance (e.g., at a first market), such as an unknown spare resource instance, based on the second data defining the second spare resource instance (e.g., at a second market), such as a known spare resource instance. That is, the evaluation component 216 can generate the availability score defining prediction of availability of the unknown first spare resource instance based on data defining the known second spare resource instance (e.g., a known second spare resource instance that has a suitable correlation score relative to the unknown first spare resource instance). The evaluation component 216 further can provide the availability score to a device associated with an entity that is to use the spare resource instance. That is, the spare resource instance prediction system 202 can be defined as comprising a practical application of data, such as realtime and/or historical data, to help better inform a user entity in making a decision for deploying a spare resource instance (e.g., an unknown spare resource instance), for which there is low availability of data than for other, known spare resource instances.

In one or more embodiments, it will be appreciated that the availability scores can be determined only for those spare resource instances that have been identified as satisfying the request contexts of a request 304.

In one or more other embodiments, one or more availability scores can be determined separate from any identification of spare resource instances based on request context. For example, such availability scores can be based on one or more default setting of the spare resource instance prediction system 202, such as distance between the user entity and a spare resource instance, and/or preference for one or more spare resource instances with low spare resource instance cost. In one or more cases, request contexts can be matched to one or more availability scores having the highest value, for example.

In one or more other embodiments, few and/or no request contexts can be determined. In such scenarios, availability scores can be determined for various available spare resource instances, such as based on one or more default setting of the spare resource instance prediction system 202, such as distance between the user entity and a spare resource instance, and/or preference for one or more spare resource instances with low spare resource instance cost.

In any of the above cases, availability scores can be compared to one another by the evaluation component 216, such as where a spare resource instance having a highest availability score can be suggested to a user entity for use. Additionally, and/or alternatively, plural spare resource instances and/or associated availability scores can be communicated to a user entity, such as to a device associated with a user entity that is to use one of the spare resource instances.

Turning now to the generation of the availability scores, various methods can be suitable for generating an availability score.

In one or more embodiments, the correlations (e.g., correlation scores) generated by the correlation component 218 can be used by the evaluation component 216, where context data for the correlated known spare resource instance is used as the context for the specified unknown spare resource instance because context was not otherwise available for the unknown spare resource instance (e.g., being rare, unpopular, newly popular and/or new). For example, known contexts of a known spare resource instance can be used to determine an availability score by the evaluation component 216 for an unknown spare resource instance, such as in a case where the known spare resource instance has a suitable correlation score relative to the unknown spare resource instance. That is, the evaluation component 216 can compare one or more contexts to one another, which contexts can be known representations being used to represent unknown spare resource instances in view of the one or more correlations having been performed for such unknown spare resource instances. That is, the availability scores can be at least partially based on the correlation scores.

The known contexts employed can comprise historical known contexts, such as stored in any suitable form at a knowledge database accessible by the spare resource instance prediction system 202, such as the knowledge database 228. Additionally and/or alternatively the known contexts can comprise realtime and/or recent contexts, such as recently observed (e.g., time elapsed since last interruption) for one or more known spare resource instances.

In one or more additional and/or alternative embodiments, the availability score can be at least partially based on one or more contexts of the correlated known spare resource instance (e.g., used instead as data for the known spare resource instance). For example, in one or more embodiments, at least one context on which an availability score can be based can be and/or comprise interruption data, such as defining a past interruption of the known spare resource instance to which the unknown spare resource instance was correlated (e.g., for an availability score related to a spare resource instance for an unknown market). The past interruption data can be that of another spare resource instance that is related to the known spare resource instance, wherein "related" in this use can refer to being from a same subset, service provider and/or market.

For example, the past interruption can comprise a rescinding of a past spare resource instance by a service provider of the known spare resource instance. The past interruption data for the past interruption can comprise a quantity of time elapsed since occurrence of the most recent past spare resource instance interruption. Accordingly, an availability score can thus represent at least an aspect of interruption data having been ranked into the availability score.

In one or more embodiments, additional and/or alternative interruption-based contexts on which an availability score can be based can be frequency of interruptions, quantity of interruptions.

In one or more embodiments, the prediction of availability defined by/represented by the availability score for the spare resource instance can comprise an indication of a predicted non-interruption of the spare resource instance by a service provider of the unknown spare resource instance. In one or more embodiments, the prediction of availability defined by/represented by the availability score for the spare resource instance can comprise an indication of a predicted amount of uninterrupted time before rescinding of the spare resource instance by a service provider of the unknown spare resource instance. That is, for example, the availability score can be based on past interruption data, such as quantity of time elapsed since occurrence of the most recent past spare resource instance interruption and/or time elapsed between two most recent interruptions. Thus, the availability score can represent a ranking of such time elapsed for one spare resource instance as compared to time elapsed for another spare resource instance (e.g., via another comparable availability score).

In one such case, such time elapsed can be compared to a requested minimum amount of time for use of a spare resource instance, which request context can be employed as a threshold for the time elapsed. Availability scores can be assigned based on difference between the threshold and the time elapsed. For example, higher availability scores can be assigned to available spare resource instances for which time elapsed between two most recent interruptions is much greater than the requested minimum threshold time. In another example, higher availability scores can be assigned to available spare resource instances for which quantity of time elapsed since occurrence of the most recent past spare resource instance interruption is much lower than the requested minimum threshold time (meaning there is correspondingly greater time until a next instance interruption).

In another example, an algorithm and/or equation can be employed where one or more certain contexts are provided with certain rankings for use in such algorithm and/or equation.

In still another example, the evaluation component 216 can identify one or more contexts repeatedly requested by an entity and can employ those one or more contexts in a future analysis.

It is noted that availability scores can be provided using any suitable units and/or range. For example, in one or more embodiments, availability scores provided by the evaluation component 216 can range between 0 and 100. In one or more embodiments, a default score for a spare resource instance can be approximately 70, such as where low and/or no data is known for a spare resource instance, at least until being correlated to a known spare resource instance having more available data related to the known spare resource instance.

In addition to communication of one or more available spare resource instances and/or associated availability scores, the evaluation component 216 can provide one or more aspects of additional information. For example, a Venn-diagram, such as the diagram 500 can be visually provided to allow for explainability of one or more processes performed by the evaluation component 216 and/or by another component of the spare resource instance prediction system 202. Multiple available spare resource instances can be provided, such as being ranked by availability score. Additional rankings can be employed, such as cost and/or prediction of time until next interruption. In one or more embodiments, any of the aforementioned results and/or scores can be communicated in a form that can be visually displayed, such as at a graphical user interface, of a device associated with a user entity and/or administrator entity.

In a case where available spare resource instances have low availability scores, such as being below an allowable availability score threshold, the spare resource instance prediction system 202 can instead recommend use of an on-demand instance at full price. This process can be employed such as where price is not an issue to a user entity, and/or where full price satisfies a specified price threshold. Where price is more important and/or where full price does not satisfy a specified price threshold, and/or where no full price solution is to be employed, the allowable availability score threshold can be ignored/overridden and a spare resource instance having a highest availability score can be deployed. It is noted that such allowable availability score threshold can be set by a user entity, administrator entity and/or can be a default.

Turning now again briefly to FIG. 5, the diagram 500 will be further described to illustrate one example of processes that can be performed by the evaluation component 216, to further summarize the above description related to the evaluation component 216.

As illustrated, request contexts of a request 304 can comprise interruption allowance (e.g., whether an interruption can be allowed) and time range availability (e.g., time of spare resource instance until interruption). One or more of these request contexts can be correlated to and/or matched to contexts of the known subset A (e.g., correlated interruption data and/or time range availability. It is noted that the contexts for known subset A can be used where the request 304 specifies an unknown subset E (e.g., new subset E) and/or where it is preferred to use new subset E, such as due to price, region and/or any other context of new subset E. That is, due to low available data for new subset E, contexts for known subset A, correlated to new subset E, can be employed by the evaluation component 216. In comparison to one or more other spare resource instances and/or subsets thereof, it can be determined by the evaluation component 216 that known subset A has a highest availability score, which availability score can relate to and/or be based on one or more interruption-related contexts.

Turning now again to FIG. 2, to aid in generating availability scores, and/or to aid in matching request contexts to contexts, the evaluation component 216 can employ and/or comprise an analytical model, such as the predictive analytical model 220. The predictive analytical model 220 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the predictive analytical model 220 can comprise a machine learning (ML) model that can be trained on historical data of one or more markets, requests, entities using spare resource instance and/or service providers.

For example, the predictive analytical model 220 can receive, as an input, available contexts that can be identified by the determination component 214 for spare resource instances, such as identified correlated known spare resource instances, and/or for a request 304 for a spare resource instance. Based on these contexts, the predictive analytical model 220 can match spare resource instances to resource contexts and/or generate one or more availability scores for spare resource instances, such as available spare resource instances. The generating the availability scores can comprise predicting, based on historical data, one or more interruption criteria, such as time until next instance interruption, on which the availability score can be based.

Turning now again to the evaluation component 216, this component can, where suitable, deploy a selected spare resource instance, such as based on the availability score, in a networked system. Thus, a spare resource instance can be at least partially deployed at one end of a network by a device associated with a user entity (e.g., comprising the evaluation component 216), over and/or in the networked system. It is understood that another partial deployment can be executed at another end of the network (e.g., operably connected to the one end) by the service provider, over and/or in the networked system.

The deployment by the evaluation component 216 can comprise instantiating the spare resource instance over the network, employing the spare resource instance over the network, and/or operating an application over the network using the spare resource instance.

Turning now to yet an additional and/or optional component of the spare resource instance prediction system 202, relative to either of the predictive analytical model 220 or the retrieval analytical model 222, also now referred to herein in combination as analytical models 220/222, in one or more embodiments, the training component 224 can train the analytical models 220/222.

For example, training of the analytical models 220/222 can be based on a combination of test data and training data for various contexts, such as comprising and/or being based on historical data for one or more spare resource instances. For example, in one or more cases, historical data can be stored at the memory 204, knowledge database 228, and/or at any other suitable store internal to and/or external to the spare resource instance prediction system 202.

In one or more embodiments, spare resource instance pairs with known scores can be employed to train the analytical models 220/222 by the training component 224. In ML this can be referred to as use of supervision labels. The analytical models 220/222 can thus be trained to generate scores (e.g., correlation scores and/or availability scores) given the input. To this end, at least the retrieval analytical model 222 can calculate a historical distance between one or more known spare resource instances, such as employing Pearson correlation and/or dynamic time wrapping. The historical distances can be scored, e.g., being the correlation scores.

Further, calculating scores based on/between historical data is not limited to a single score, as there can be many ways to measure distances between time series. It is noted that such scores, being stored at any suitable cache such as the knowledge database 228, can be useful due to the scores changing only where the analytical model 220/222 is retrained, such as based on newly available data, contexts and/or spare resource instances. Furthermore, the analytical models 220/222 can be trained to filter out spare resource instances that have not been used and/or for which historical data is below a threshold, for example.

The training component 224 can execute the training/retraining at any suitable frequency, such as after each spare resource instance availability prediction, based on a selected timing, and/or on-demand.

In one or more embodiments, the training component 224 and/or determination component 214 can identify, such as stamp, a context, spare resource instance, market, entity using a spare resource instance and/or service provider on which the analytical model 220/222 is not yet trained and/or for which data is not stored at one or more knowledge databases employed by the analytical models 220/222, such as the knowledge database 228. In such case, the training component 224 can initiate training of an analytical model 220/222 on the unknown data and can write and/or direct the writing of the data to a suitable storage location, such as the knowledge database 228, for access by the respective analytical model 220/222.

In accordance with the training, the analytical models 220/222 can be updated, such as continually updated. Further, by the training, subsequent iterations of use of the spare resource instance prediction system 202 can be made more accurate and/or efficient. That is, the spare resource instance prediction system 202 can improve itself over time.

Turning now to FIG. 6, and particularly to table 650 at FIG. 6, an example of retraining of the predictive analytical model 220 will be described.

In one or more embodiments, retraining can be based on various realtime data obtained, such as after communicating prediction and/or spare resource identification. For example, a number of false positive or false negative predictions can be logged and employed, such as to adjust one or more threshold employed by the analytical models. A false positive can be defined as predicting a spare resource interruption when no interruption actually occurred (e.g., wrongly, positively predicting an interruption). A false negative can be defined as failure to predict one or more spare resource interruptions that occurred (e.g., wrongly negatively predicting no interruption would occur). As mentioned, one or more thresholds of allowance of incorrect interruptions predicted, such as for replacement of an existing spare resource instance, and/or of allowance of interruptions missed (e.g., not predicted) can be updated based on this realtime data, where the thresholds can be employed by the predictive analytical model 220, with the predictive analytical model 220 being retrained on the realtime data such as to update the thresholds.

In connection with these one or more embodiments, the Collected Real Time Result Data Table 650 at FIG. 6 illustrates a plurality of rows each representing a different percentage of incorrect replacements (e.g., false positives). That is, a quantitative number of interruptions for a wide range of allowed incorrect replacements can be measured. Additional columns illustrate the number of subsets that were "enriched", meaning that these subsets had a correlation score assigned based on a known spare resource instance/subset having greater contexts available for the known spare resource instance/subset. The additional columns are separated into new and all subsets, in connection with original (non-enriched) versus enriched counts of subsets.

As a result, and as illustrated, use of predictive analytical model 220 can consistently reduce the number of interruptions for spare resource instances/subsets selected to be used (e.g., for which a spare resource instance was used, deployed and/or purchased). This can be the case where only a low number of incorrect interruptions, such as for replacement of an existing spare resource instance, is permitted.

Importantly, for unknown spare resource instances/subsets, such as new spare resource instances/subsets, the improvement can be more significant. For instance, when allowing for 20% of wrong interruptions, the improvement on new subsets is depicted as 2.4% and a lower 1.8% for all the subsets of a group combined (e.g., known and unknown). That is, a percentage of incorrect interruptions can be employed as an allowable availability threshold with which to screen availability scores and/or available spare resource instances. Likewise, the realtime data, such as observed after issuing an availability score, and related to the percentage of incorrect interruptions can be employed to train the predictive analytical model 220.

Figure 7:
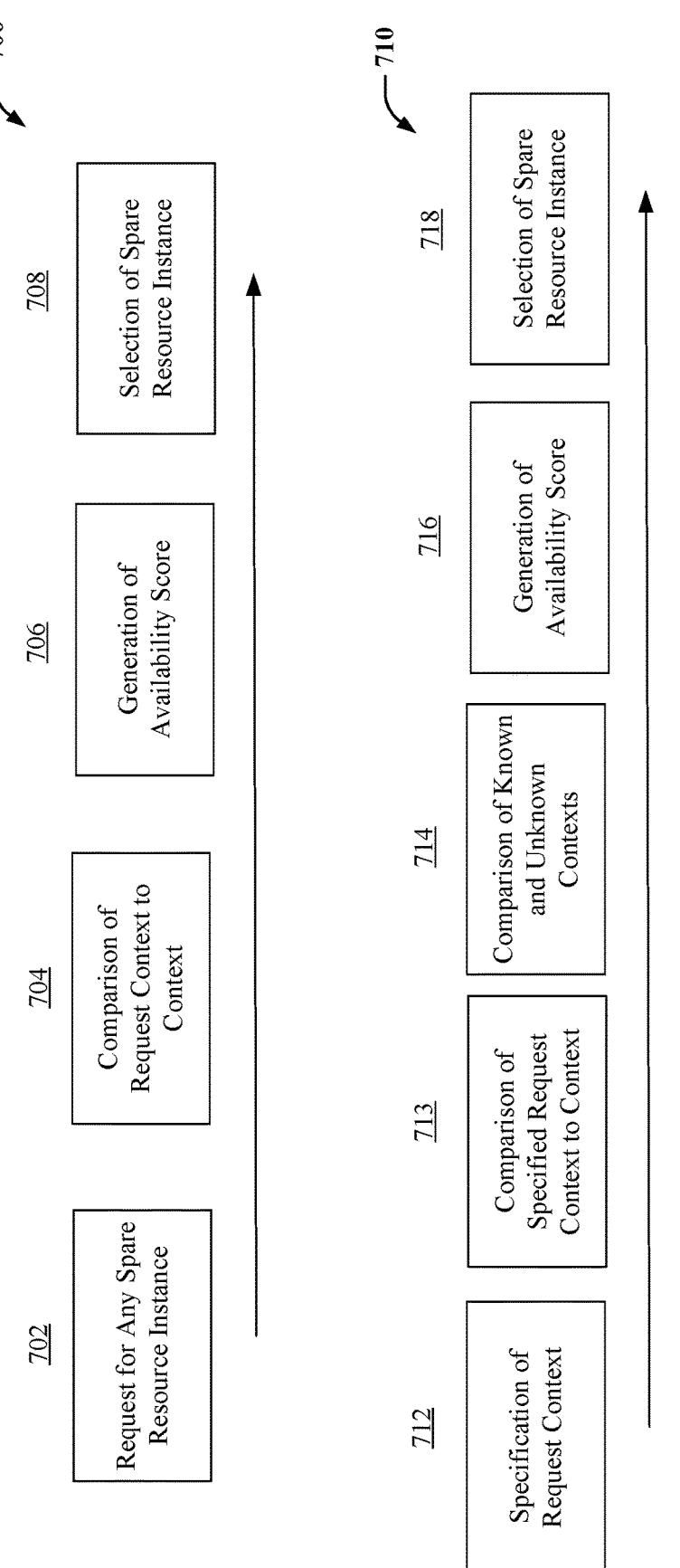
FIG. 7 depicts a pair of block-based flow diagrams of processes that can be performed by a spare resource instance prediction system, in accordance with one or more embodiments described herein.

Looking now to FIG. 7, flow models 700 and 710 are provided to further illustrate the one or more processes that can be performed by the spare resource instance prediction system 202.

At flow model 700, a request 702 for any spare resource instance can be obtained by the obtaining component 212. Based on request contexts and contexts determined by the determination component 214, the evaluation component 216 (e.g., employing the predictive analytical model 220) can execute a comparison 704 of one or more request contexts to one or more contexts (e.g., of known or unknown spare resource instances).

In response to these inputs, the evaluation component 216 can perform generation 706 of an availability score and subsequent selection 708 of a spare resource instance and/or subset thereof to satisfy the request 702.

Looking to flow model 710, differently, the obtaining component 212 can obtain a request 712 for a request context. Based on the one or more request contexts and contexts determined by the determination component 214, and/or based on one or more correlation scores generated by the correlation component 218/retrieval analytical model 222, the evaluation component 216/predictive analytical model 220 can perform a comparison 713 of the specified request context to context (e.g., of known and/or unknown spare resource instances).

Further, based on the one or more contexts determined by the determination component 214, the correlation component 218/retrieval analytical model 222 can perform a comparison 714 of known contexts to unknown contexts (e.g., comprising the specified request context). In connection with the comparisons 713 and/or 714, the correlation component 218/retrieval analytical model 222 can generate a correlation score.

As a result, the evaluation component 216 can execute a generation 716 of an availability score for the specified spare resource instance and a subsequent selection 718 of a spare resource instance to satisfy the request 712, such as based on contexts for the known spare resource instance correlated to the unknown spare resource instance.

It is further noted that different uses of an output of the evaluation component 216 (e.g., of a prediction and/or selection) can be employed by the spare resource instance prediction system 202. For example, a prediction can be employed before launching a spare resource instance to choose between spare resource instances, determine backups spare resource instances, and/or to actively seek/function to replace a present/existing spare resource instance. Replacement can be determined based on a threshold and/or other comparison to a currently employed spare resource instance. Output predictions can be provided at any suitable frequency, such as every 6 minutes, for example.

Turning next to FIGS. 8 and 9, illustrated is a flow diagram of an example, non-limiting method 800 that can facilitate a process to determine spare resource instance availability, in accordance with one or more embodiments described herein, such as the non-limiting architectures 100 and/or 200. Indeed, FIG. 8 provides a flow diagram illustrating one or more processes that can be performed by and/or in connection with the spare resource instance prediction system 202 of FIG. 2. Repetitive description of like elements and/or processes employed in respective embodiments is omitted for the sake of brevity. It is noted that the non-limiting method 800 continues from FIG. 8 to FIG. 9.

Turning first to 802, the non-limiting method 800 can comprise generating, a processor (e.g., by correlation component 218), a correlation score defining a correlation between the first spare resource instance and the second spare resource instance, wherein the correlation score is employed to generate the availability score.

At 804, the non-limiting method 800 can comprise aggregating, by the processor (e.g., by correlation component 218), contexts of a plurality of spare resource instances, including the first spare resource instance and the second spare resource instance.

At 806, the non-limiting method 800 can comprise generating, by the processor (e.g., by correlation component 218), a profile correlating the plurality of spare resource instances to one another.

At 808, the non-limiting method 800 can comprise identifying, by the processor (e.g., by correlation component 218), based on first data defining the first spare resource instance, a second spare resource instance. In one or more cases, an identifiable second amount of second data defining the second spare resource instance is greater than an identifiable first amount of the first data.

At 810, the non-limiting method 800 can comprise identifying, by the processor (e.g., by correlation component 218), the second spare resource instance, using the profile.

At 812, the non-limiting method 800 can comprise identifying, by the processor (e.g., by correlation component 218), the second spare resource instance based on the correlation score being higher than a second correlation score of the first spare resource instance with a third spare resource instance, wherein the second correlation score defines a correlation between the first spare resource instance and the third spare resource instance.

At 814, the non-limiting method 800 can comprise identifying, by the processor (e.g., by determination component 214), a request context defining a requested spare resource instance, wherein the requested spare resource instance is defined as a new spare resource instance or a replacement of an already deployed spare resource instance.

At 816, the non-limiting method 800 can comprise generating, by the processor (e.g., by evaluation component 216), an availability score defining prediction of availability of the first spare resource instance based on the second data defining the second spare resource instance.

At 818, the non-limiting method 800 can comprise generating, by the processor (e.g., by evaluation component 216), the availability score based on interruption data defining a past interruption of a fourth spare resource instance related to the second spare resource instance, wherein the past interruption comprises a rescinding of the fourth spare resource instance by a service provider of the second spare resource instance.

At 820, the non-limiting method 800 can comprise generating, by the processor (e.g., by evaluation component 216), the availability score based on interruption data wherein the interruption data comprises a quantity of time elapsed since occurrence of the fourth spare resource instance.

At 822, the non-limiting method 800 can comprise generating, by the processor (e.g., by evaluation component 216), the prediction of availability of the first spare resource instance, wherein the prediction comprises an indication of a predicted amount of uninterrupted time before rescinding of the first spare resource instance by a service provider of the first spare resource instance.

At 824, the non-limiting method 800 can comprise providing, by the processor (e.g., by evaluation component 216), the availability score to a device associated with an entity that is to use the first spare resource instance.

At 826, the non-limiting method 800 can comprise training, by the processor (e.g., by training component 224), an analytical model (e.g., predictive analytical model 220 and/or retrieval analytical model 222) based on a new spare resource instance or a new context, which new spare resource instance or new context is not previously trained on by the analytical model.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, computer program products, and/or computer-implemented methods are provided herein to a process to predict availability of a spare resource instance. A system can comprise a memory that stores computer executable components, and a processor that executes the computer executable components stored in the memory. The computer executable components can comprise a correlation component that, based on a first context defining a first spare resource instance to be utilized in a networked system, identifies a second spare resource instance, and an evaluation component that generates an availability score defining prediction of availability of the first spare resource instance based on a second context defining the second spare resource instance, wherein the evaluation component further deploys the first spare resource instance, based on the availability score, in the networked system.

An advantage of any one or more of the aforementioned system, computer program product and/or computer-implemented method can be an ability to compute availability metrics for unknown subsets of one or more spare resource instances, including new, unpopular, newly popular and/or rare subsets spare resource instances. That is, for an unknown subset of spare resource instances for which low or even no spare resource instance interruption data is available, identifiable and/or offered, one or more correlations can be drawn between such unknown subset of spare resource instances and at least one known subset of spare resource instances for which greater information, including spare resource interruption data, is known (e.g., available, identifiable and/or offered).

For example, an identifiable second amount of second data defining a second spare resource instance (e.g., known) can be greater than an identifiable first amount of first data defining a first spare resource instance (e.g., unknown). In this way, the second data of the second spare resource instance, being correlated to the first spare resource instance, can be employed to identify and/or predict availability of the first spare resource instance. The first data and the second data each can comprise one or more contexts defining the respective spare resource instances.

For another example, in view of the reference above to a "market", an identifiable second amount of second data defining a second market, subset of spare resource instance, service provider and/or subset of service providers (e.g., known) can be greater than an identifiable first amount of first data defining a first market, subset of spare resource instances, service provider and/or subset of service providers (e.g., unknown).

Another advantage of any one or more of the aforementioned system, computer program product and/or computer-implemented method can be ability of an entity to obtain a spare resource instance that can be employed for a longer uninterrupted time as compared to existing spare resource instance determination frameworks. Indeed, the one or more frameworks provided herein can enable an entity to be provided with more efficient use of available spare resource instances, such as by having a better understanding of available uninterrupted timing of such spare resource instances.

Yet another advantage of any one or more of the aforementioned system, computer program product and/or computer-implemented method can be an ability to balance time and/or resources for switching spare resource instances ahead of a predicted interruption of a current spare resource instance. This can be desired as compared to an alternative of being notified with short notice of spare resource instance recovery (e.g., rescinding) by a service provider, which in turn can cause the launch of a new spare resource instance out of the blue to continue the entity's work at the new spare resource instance.

Still another advantage of any one or more of the aforementioned system, computer program product and/or computer-implemented method can be a practical application of data, such as realtime and/or historical data, to help better inform a user entity (and/or a device associated with and/or used by a user entity) in making a decision for deploying an unknown spare resource instance, for which there is low availability of data than for other, known spare resource instances or one or more subsets of spare resource instances.

Another advantage of any one or more of the aforementioned system, computer program product and/or computer-implemented method can be self-improvement of the system such as by continually training analytical models employed by the system, at a suitable frequency. The analytical models can be employed generate the availability score. Due to the updating, subsequent iterations of use of the system can be made more accurate and/or efficient. That is, the system can improve itself over time.

In one or more embodiments, the analytical models can be updated based on realtime data determined after communication of an availability score. The update can be performed based on a number of false positive or false negative predictions, which information can be employed, to adjust one or more threshold employed by the analytical models in generating the availability scores. Due to such updating, subsequent iterations of use of the system can be made more accurate and/or efficient. That is, the system can improve itself over time.

In one or more embodiments, the correlation component further can generate a correlation score defining a correlation between the first spare resource instance and the second spare resource instance, wherein the correlation score can be employed by the evaluation component to generate the availability score. An advantage of this feature can be an ability to compare correlation scores of various spare resource instances with the first spare resource instance, such as to determine a highest correlation score. In this way, data from a spare resource instance having available data, as compared to the low or unavailable data of the first spare resource instance, can be employed by the system for selecting the first an available spare resource instance and/or predicting availability, such as amount of uninterrupted time before rescinding, of the first spare resource instance.

Indeed, in view of the one or more embodiments described herein, a practical application of the systems, computer-implemented methods, and/or computer program products described herein can be the implementation of a spare resource instance for which interruption metrics are predicted by a framework provide herein. Yet another practical application can be the ability to be prepared for a predicted interruption, which preparedness can comprise requesting a replacement spare resource instance ahead of time. This knowledge can allow for efficient spare resource instance usage and efficient running of programs and/or software over a cloud environment using spare resource instances. Such usage can be planned and made more efficient, such as only operating over the spare resource instance according to the predicted uninterrupted time (e.g., matching a usage time range to the predicted spare resource instance availability time range). Overall, such computerized tools can constitute a concrete and tangible technical improvement in the field of spare resource instance usage, including server instance usage such as spot instances, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to unknown spare resource instance metric correlation and/or spare resource instance metric prediction, as compared to existing systems and/or techniques lacking such approach(es). Systems, computer-implemented methods, and/or computer program products facilitating performance of these processes are of great utility in the field of spare resource instance usage, including server instance usage such as spot instances, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically predict spare resource instance availability, predict uninterrupted spare resource time, and/or correlate unknown spare resource instances to known spare resource instances, as the one or more embodiments described herein can facilitate these processes. And, neither can the human mind nor a human with pen and paper electronically perform these processes, as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

Figure 10:
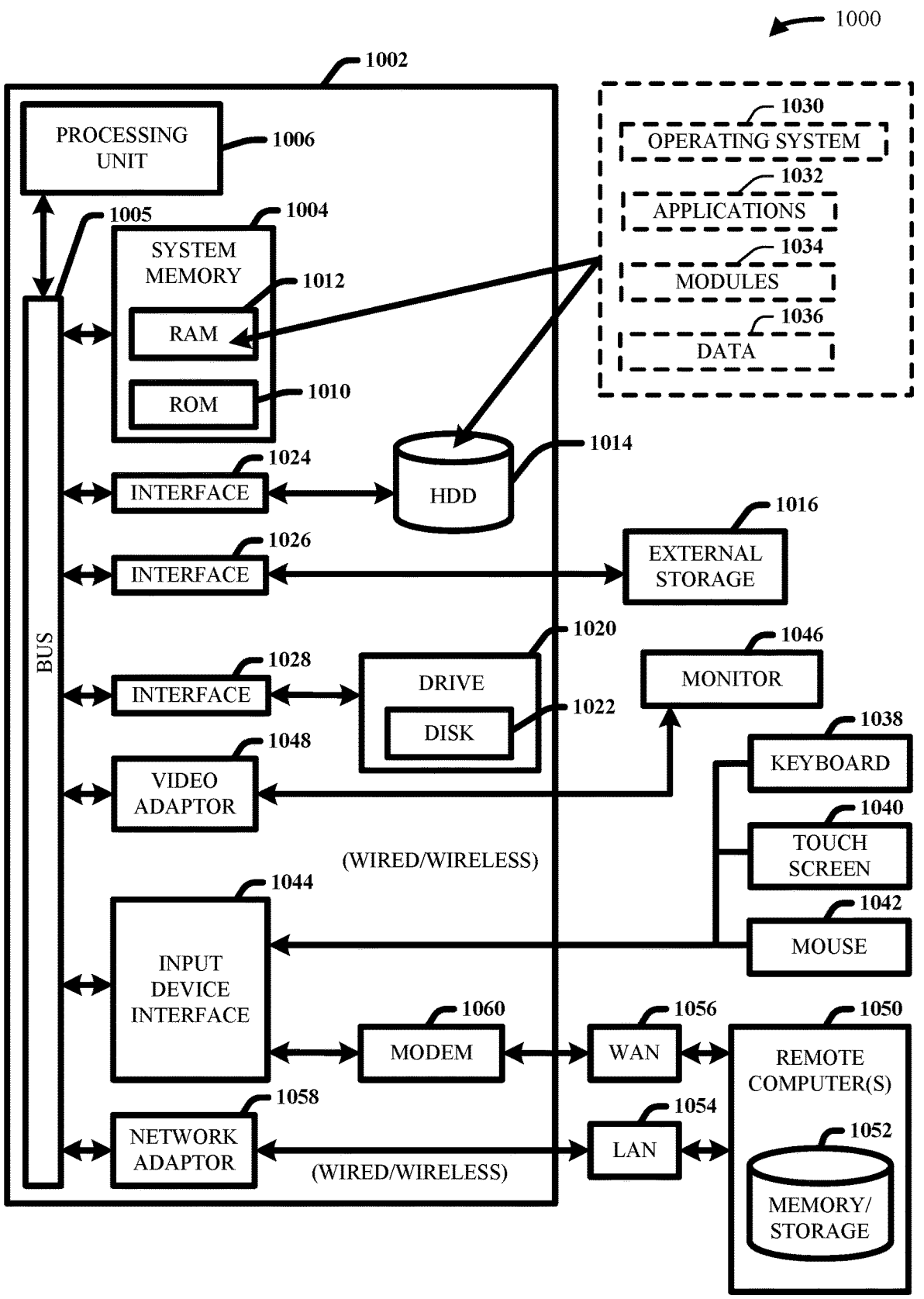
FIG. 10 illustrates a block diagram of an example, non-limiting, operating environment in which one or more embodiments described herein can be facilitated.
Figure 11:
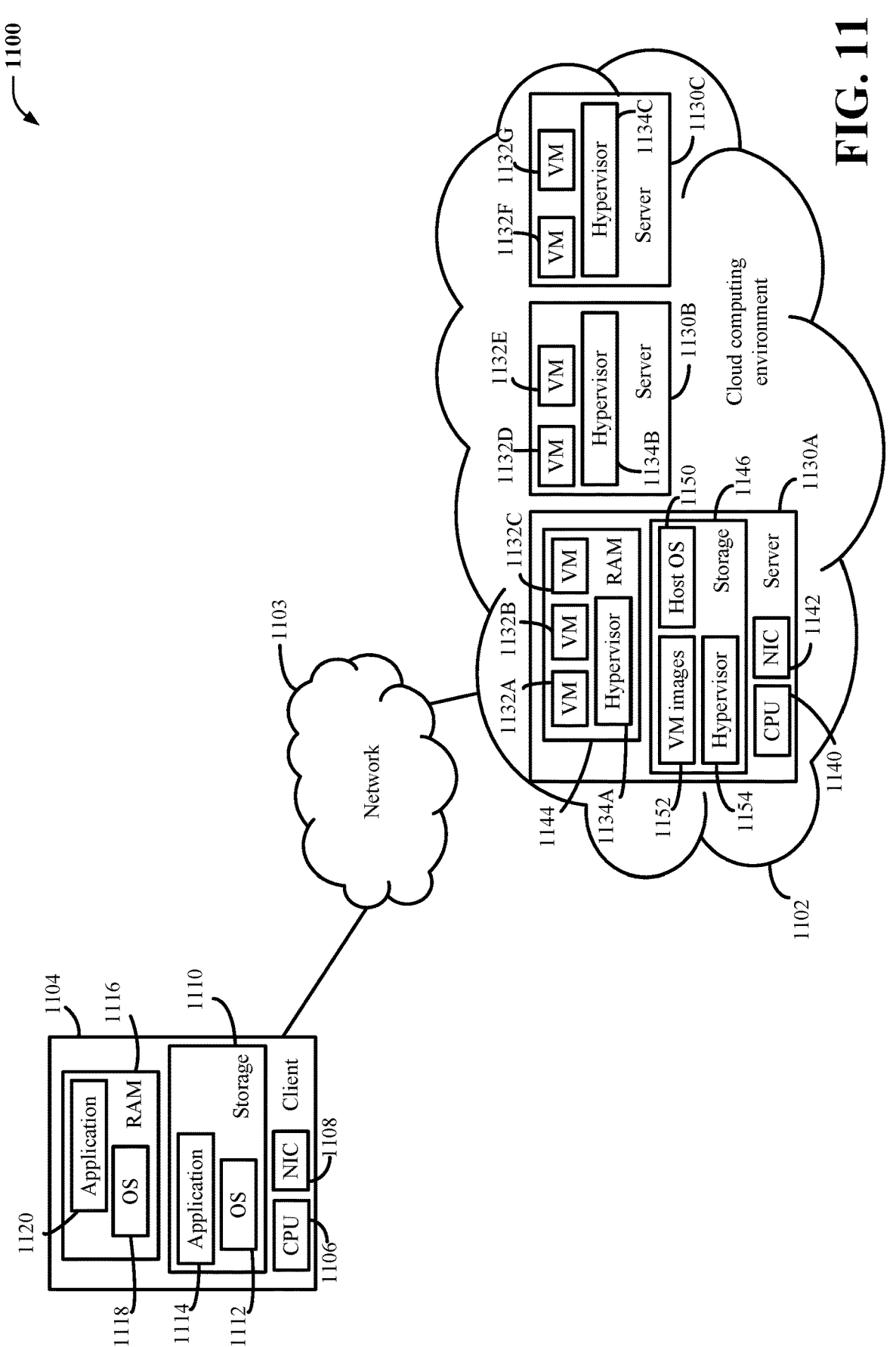
FIG. 11 illustrates a block diagram of an example, non-limiting, cloud computing environment, in accordance with one or more embodiments described herein.

Turning next to FIGS. 10 and 11, a detailed description is provided of additional context for the one or more embodiments described herein at FIGS. 1-9.

FIG. 10 and the following discussion are intended to provide a brief, general description of a suitable operating environment 1000 in which one or more embodiments described herein at FIGS. 1-9 can be implemented. For example, one or more components and/or other aspects of embodiments described herein can be implemented in or be associated with, such as accessible via, the operating environment 1000. Further, while one or more embodiments have been described above in the general context of computer-executable instructions that can run on one or more computers, those skilled in the art will recognize that one or more embodiments also can be implemented at least partially in parallel with other program modules and/or as a combination of hardware and software.

Generally, program modules include routines, programs, components and/or data structures, that perform tasks and/or implement abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices and/or microprocessor-based or programmable consumer electronics, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 10, the example operating environment 1000 for implementing one or more embodiments of the aspects described herein can include a computer 1002, the computer 1002 including a processing unit 1006, a system memory 1004 and/or a system bus 1005. One or more aspects of the processing unit 1006 can be applied to processors such as 106 and/or 206 of the non-limiting architectures 100 and/or 200. The processing unit 1006 can be implemented at least partially in parallel with and/or alternatively to processors such as 106 and/or 206.

Memory 1004 can store one or more computer and/or machine readable, writable and/or executable components and/or instructions that, when executed by processing unit 1006 (e.g., a classical processor, and/or like processor), can facilitate performance of operations defined by the executable component and/or instruction. For example, memory 1004 can store computer and/or machine readable, writable, and/or executable components and/or instructions that, when executed by processing unit 1006, can facilitate execution of the one or more functions described herein relating to non-limiting architecture 100 and/or non-limiting architecture 200, as described herein with or without reference to the one or more figures of the one or more embodiments.

Memory 1004 can comprise volatile memory (e.g., random access memory (RAM), static RAM (SRAM) and/or dynamic RAM (DRAM)) and/or non-volatile memory (e.g., read only memory (ROM), programmable ROM (PROM), electrically programmable ROM (EPROM) and/or electrically erasable programmable ROM (EEPROM)) that can employ one or more memory architectures.

Processing unit 1006 can comprise one or more types of processors and/or electronic circuitry (e.g., a classical processor and/or like processor) that can implement one or more computer and/or machine readable, writable and/or executable components and/or instructions that can be stored at memory 1004. For example, processing unit 1006 can perform one or more operations that can be specified by computer and/or machine readable, writable, and/or executable components and/or instructions including, but not limited to, logic, control, input/output (I/O) and/or arithmetic. In one or more embodiments, processing unit 1006 can be any of one or more commercially available processors. In one or more embodiments, processing unit 1006 can comprise one or more central processing unit, multi-core processor, microprocessor, dual microprocessors, microcontroller, System on a Chip (SOC), array processor, vector processor, and/or another type of processor. The examples of processing unit 1006 can be employed to implement one or more embodiments described herein.

The system bus 1005 can couple system components including, but not limited to, the system memory 1004 to the processing unit 1006. The system bus 1005 can comprise one or more types of bus structure that can further interconnect to a memory bus (with or without a memory controller), a peripheral bus, and/or a local bus using one or more of a variety of commercially available bus architectures. The system memory 1004 can include ROM 1010 and/or RAM 1012. A basic input/output system (BIOS) can be stored in a non-volatile memory such as ROM, erasable programmable read only memory (EPROM) and/or EEPROM, which BIOS contains the basic routines that help to transfer information among elements within the computer 1002, such as during startup. The RAM 1012 can include a high-speed RAM, such as static RAM for caching data.

The computer 1002 can include an internal hard disk drive (HDD) 1014 (e.g., EIDE, SATA), one or more external storage devices 1016 (e.g., a magnetic floppy disk drive (FDD), a memory stick, a flash drive reader and/or a memory card reader) and/or a drive 1020, e.g., such as a solid state drive or an optical disk drive, which can read or write from a disk 1022, such as a CD-ROM disc, a DVD and/or a BD. Additionally, and/or alternatively, where a solid-state drive is involved, disk 1022 could not be included, unless separate. While the internal HDD 1014 is illustrated as located within the computer 1002, the internal HDD 1014 can also be configured for external use in a suitable chassis (not shown). Additionally, while not shown in operating environment 1000, a solid-state drive (SSD) can be used in addition to, or in place of, an HDD 1014. The HDD 1014, external storage device 1016 and drive 1020 can be connected to the system bus 1005 by an HDD interface 1024, an external storage interface 1026 and a drive interface 1028, respectively. The HDD interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1012, including an operating system 1030, one or more applications 1032, other program modules 1034 and/or program data 1036. All or portions of the operating system, applications, modules, and/or data can also be cached in the RAM 1012. The systems and/or methods described herein can be implemented utilizing one or more commercially available operating systems and/or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In a related embodiment, operating system 1030 can comprise one virtual machine (VM) of multiple VMs hosted at computer 1002. Furthermore, operating system 1030 can provide runtime environments, such as the JAVA runtime environment or the .NET framework, for applications 1032. Runtime environments are consistent execution environments that can allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and/or settings for an application.

Further, computer 1002 can be enabled with a security module, such as a trusted processing module (TPM). For instance, with a TPM, boot components hash next in time boot components and wait for a match of results to secured values before loading a next boot component. This process can take place at any layer in the code execution stack of computer 1002, e.g., applied at application execution level and/or at operating system (OS) kernel level, thereby enabling security at any level of code execution.

An entity can enter and/or transmit commands and/or information into the computer 1002 through one or more wired/wireless input devices, e.g., a keyboard 1038, a touch screen 1040 and/or a pointing device, such as a mouse 1042. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera, a gesture sensor input device, a vision movement sensor input device, an emotion or facial detection device, and/or a biometric input device, e.g., fingerprint and/or iris scanner. These and other input devices can be connected to the processing unit 1006 through an input device interface 1044 that can be coupled to the system bus 1005, but can be connected by other interfaces, such as a parallel port, an IEEE 1394 serial port, a game port, a USB port, an IR interface and/or a BLUETOOTH® interface.

A monitor 1046 or other type of display device can be alternatively and/or additionally connected to the system bus 1005 via an interface, such as a video adapter 1048. In addition to the monitor 1046, a computer typically includes other peripheral output devices (not shown), such as speakers and/or printers.

The computer 1002 can operate in a networked environment using logical connections via wired and/or wireless communications to one or more remote computers, such as a remote computer 1050. The remote computer 1050 can be a workstation, a server computer, a router, a personal computer, portable computer, microprocessor-based entertainment appliance, a peer device and/or other common network node, and typically includes many or all of the elements described relative to the computer 1002, although, for purposes of brevity, only a memory/storage device 1052 is illustrated. Additionally, and/or alternatively, the computer

1002 can be coupled (e.g., communicatively, electrically, operatively and/or optically) to one or more external systems, sources, and/or devices (e.g., computing devices, communication devices and/or like device) via a data cable (e.g., High-Definition Multimedia Interface (HDMI), recommended standard (RS) 232 and/or Ethernet cable).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver and/or a decoder), software (e.g., a set of threads, a set of processes and/or software in execution) and/or a combination of hardware and/or software that facilitates communicating information among one or more embodiments described herein and external systems, sources, and/or devices (e.g., computing devices and/or communication devices).

The logical connections depicted include wired/wireless connectivity to a local area network (LAN) 1054 and/or larger networks, e.g., a wide area network (WAN) 1056. LAN and WAN networking environments can be commonplace in offices and companies and can facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired and/or wireless communication to the LAN 1054, which can also include a wireless access point (AP) disposed thereon for communicating with the adapter 1058 in a wireless mode.

When used in a WAN networking environment, the computer 1002 can include a modem 1060 and/or can be connected to a communications server on the WAN 1056 via other means for establishing communications over the WAN 1056, such as by way of the Internet. The modem 1060, which can be internal and/or external and a wired and/or wireless device, can be connected to the system bus 1005 via the input device interface 1044. In a networked environment, program modules depicted relative to the computer 1002 or portions thereof can be stored in the remote memory/storage device 1052. The network connections shown are merely exemplary and one or more other means of establishing a communications link among the computers can be used.

When used in either a LAN or WAN networking environment, the computer 1002 can access cloud storage systems or other network-based storage systems in addition to, and/or in place of, external storage devices 1016 as described above, such as but not limited to, a network virtual machine providing one or more aspects of storage and/or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, such as with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand and/or store shelf). This can include Wireless Fidelity (Wi-Fi) and BLUETOOTH® wireless technologies. Thus, the communication can be a defined structure as with a conventional network or simply an ad hoc communication between at least two devices.

The illustrated embodiments described herein can be employed relative to distributed computing environments (e.g., cloud computing environments), such as described below with respect to FIG. 11, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1102 described below with reference to illustration 1100 of FIG. 11. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting architectures 100 and/or 200, and/or the example operating environment 1000 of FIG. 10, can be associated with and/or be included in cloud-based and/or partially-cloud-based system.

Referring now to details of one or more elements illustrated at FIG. 11, the illustrative cloud computing environment 1102 is depicted. Cloud computing environment 1102 can comprise one or more cloud computing nodes and/or virtual machines which are used by clients 1104, such as the computer 1002. The client 1104 (e.g., client entity) has a processor 1106, network interface card (NIC) 1108, storage 1110 which holds the operating system 1112 and any applications 1114, and RAM 1116 which stores the executing operating system 1118 and applications 1120. The client 1104 is connected to the cloud computing environment 1102 by a network 1103, such as the Internet.

The cloud computing environment 1102 is illustrated as having three servers 1130A, 1130B and 1130C. Each server 1130A-1130C includes three virtual machines 1132, with server 1130A including VMs 1132A-1132C, server 1130B including VMs 1132D-1132E and server 1130C including VMs 1132F-1132G; and a hypervisor 1134A-1134C. More detail is provided of server 1130A as exemplary of the servers 1130B and 1130C. The server 1130A includes a processing unit 1140, a NIC 1142, RAM 1144 and non-transitory storage 1146. The RAM 1144 includes the operating virtual machines 1132A-1132C and the operating hypervisor 1134A. The non-transitory storage 1146 includes stored versions of the host operating system 1150, the virtual machine images 1152 and the stored version of the hypervisor 1154. The servers 1130, 1130B and 1130C are connected by a network in the cloud computing environment 1102 to allow access to the network 1103 and the client 1104.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to conduct aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform tasks and/or implement abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based and/or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface,", can refer to and/or can include a computer-related entity or an entity related to an operational machine with one or more functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multicore processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random-access memory (RAM) (e.g., ferroelectric RAM (FeRAM). Volatile memory can include RAM, which can function as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system for predicting availability of unknown spare resource instances in a networked system, wherein the unknown spare resource instances have lower spare resource instance interruption data available, identifiable and/or offered in comparison to known spare resource instances in the networked system, the system comprising:
   a memory that stores computer executable components; and
   a processor that executes the computer executable components stored in the memory, wherein the computer executable components comprise:
      a correlation component configured to, based on a first context defining an unknown spare resource instance to be utilized in the networked system, identify a known spare resource instance of the known spare resource instances in the networked system;

an evaluation component configured to generate an availability score defining prediction of availability of the unknown spare resource instance based on a second context that defines the known spare resource instance, wherein the correlation component is further configured to generate a correlation score defining a correlation between the unknown spare resource instance and the known spare resource instance, wherein the availability score is generated to identify availability of the unknown spare resource instance based at least in part on the correlation score defining the correlation between the unknown spare resource instance and the known spare resource instance, and wherein the evaluation component is further configured to deploy the unknown spare resource instance or the known spare resource instances for utilization in the networked system based on the availability score.

2. The system of claim 1, wherein an identifiable second amount of second contexts, including the second context, defining the known spare resource instance is greater than an identifiable first amount of first contexts, including the first context, defining the unknown spare resource instance.

3. The system of claim 1, wherein the correlation component further identifies the known spare resource instance based on the correlation score being higher than a further correlation score of the unknown spare resource instance with a further known spare resource instance, and wherein the further correlation score defines a correlation between the unknown spare resource instance and the further known spare resource instance.

4. The system of claim 1, further comprising:

an analytical model that aggregates contexts, including the first context and the second context, of a plurality of spare resource instances, including the unknown spare resource instance and the known spare resource instance, wherein the analytical model generates a profile correlating the plurality of spare resource instances to one another, and wherein the known spare resource is identified using the profile.

5. The system of claim 1, wherein the evaluation component further generates the availability score based on interruption data defining a past interruption of a further known spare resource instance that is related to the known spare resource instance, and wherein the past interruption comprises a rescinding of the further known spare resource instance by a service provider of the known spare resource instance.

6. The system of claim 5, wherein the past interruption data comprises a quantity of time elapsed since occurrence of the past interruption of the further known spare resource instance.

7. The system of claim 1, further comprising a determination component that identifies the first context defining the unknown spare resource instance, wherein the unknown spare resource instance is defined as a new spare resource instance or a replacement of an already deployed spare resource instance.

8. The system of claim 1, wherein the prediction of availability comprises an indication of a predicted amount of uninterrupted time before rescinding of the unknown spare resource instance by a service provider of the unknown spare resource instance.

9. A computer-implemented method for predicting availability of unknown spare resource instances in a networked system, wherein the unknown spare resource instances have lower spare resource instance interruption data available, identifiable and/or offered in comparison to known spare resource instances in the networked system, the method comprising:

identifying, by a processor, a first context defining an unknown spare resource instance to be utilized in the networked system;

identifying a known spare resource instance of the known spare resource instances in the networked system based on the first context defining the unknown spare resource instance to be utilized in the networked system;

evaluating, by the processor, the identified known spare resource instance to determine a second context defining the known spare resource instance of the known spare resource instances in the networked system;

generating, by the processor, a correlation score defining a correlation between the unknown spare resource instance and the identified known spare resource instance;

generating, by the processor, an availability score for predicting availability of the unknown spare resource instance based on the second context defining the identified known spare resource instance, wherein the correlation score is employed to generate the availability score to predict availability of the unknown spare resource instance;

determining based on the availability score, by the processor, whether to deploy the unknown spare resource instance or the identified known spare resource in the networked system, wherein the availability score is generated to identify availability of the unknown spare resource instance based at least in part on the correlation score defining the correlation between the unknown spare resource instance and the known spare resource instance; and deploying the unknown spare resource instance or the known spare resource instances for utilization in the networked system based on the availability score.

10. The computer-implemented method of claim 9, wherein an identifiable second amount of second contexts, including the second context, defining the known spare resource instance is greater than an identifiable first amount of first contexts, including the first context, defining the unknown spare resource instance.

11. The computer-implemented method of claim 9, further comprising identifying, by the processor, the known spare resource instance based on the correlation score being higher than a further correlation score of the unknown spare resource instance with a further known spare resource instance, wherein the further correlation score defines a correlation between the unknown spare resource instance and the further known spare resource instance.

12. The computer-implemented method of claim 9, further comprising:

aggregating, by the processor, contexts, including the first context and the second context, of a plurality of spare resource instances, including the unknown spare resource instance and the known spare resource instance;

generating, by the processor, a profile correlating the plurality of spare resource instances to one another; and identifying, by the processor, the known spare resource instance, using the profile.

13. The computer-implemented method of claim 9, further comprising generating, by the processor, the availability score based on interruption data defining a past interruption of a further known spare resource instance that is related to the known spare resource instance, wherein the past interruption comprises a rescinding of the further known spare resource instance by a service provider of the known spare resource instance, and wherein the past interruption data comprises a quantity of time elapsed since occurrence of the past interruption of the further known spare resource instance.

14. The method of claim 9, wherein the prediction of availability comprises an indication of a predicted amount of uninterrupted time before rescinding of the unknown spare resource instance by a service provider of the unknown spare resource instance.

15. A non-transitory computer readable medium including program instructions embodied therewith, the program instructions executable by a processor to cause the processor to execute operations facilitating a process for predicting availability of unknown spare resource instances in a networked system, wherein the unknown spare resource instances have lower spare resource instance interruption data available, identifiable and/or offered in comparison to known spare resource instances in the networked system, the operations comprising:

identifying, by a processor, a first context defining an unknown spare resource instance to be utilized in the networked system;

identifying a known spare resource instance of the known spare resource instances in the networked system based on the first context defining the unknown spare resource instance to be utilized in the networked system;

evaluating, by the processor, the identified known spare resource instance to determine a second context defining the known spare resource instance of the known spare resource instances in the networked system;

generating, by the processor, a correlation score defining a correlation between the unknown spare resource instance and the identified known spare resource instance;

generating, by the processor, an availability score for predicting availability of the unknown spare resource instance to be utilized in the networked system based on the second context defining the identified known spare resource instance, wherein the availability score is generated based on the correlation score defining a correlation between the unknown spare resource instance and the identified known spare resource instance, wherein the availability score is generated to identify availability of the unknown spare resource instance based at least in part on the correlation score;

determining based on the availability score, by the processor, whether to deploy the unknown spare resource instance or the identified known spare resource instance in the networked system; and deploying the unknown spare resource instance or the known spare resource instances for utilization in the networked system based on the availability score.

16. The non-transitory computer readable medium of claim 15, wherein an identifiable second amount of second contexts, including the second context, defining the known spare resource instance is greater than an identifiable first amount of first contexts, including the first context, defining the unknown spare resource instance.

17. The non-transitory computer readable medium of claim 15, wherein the operations further comprise:

identifying, by the processor, the known spare resource instance based on the correlation score being higher than a further correlation score of the unknown spare resource instance with a further known spare resource instance, wherein the further correlation score defines a correlation between the unknown spare resource instance and the further known spare resource instance.

18. The non-transitory computer readable medium of claim 15, wherein the operations further comprise:

aggregating, by the processor, contexts, including the context, of a plurality of spare resource instances, including the unknown spare resource instance and the known spare resource instance;

generating, by the processor, a profile correlating the plurality of spare resource instances to one another; and identifying, by the processor, the second spare resource instance, using the profile.

19. The non-transitory computer readable medium of claim 15, wherein the operations further comprise:

generating, by the processor, the availability score based on interruption data defining a past interruption of known spare resource instance that is related to the known spare resource instance, wherein the past interruption comprises a rescinding of the known spare resource instance by a service provider of the known spare resource instance, and wherein the past interruption data comprises a quantity of time elapsed since occurrence of the past interruption of the known spare resource instance.

20. The non-transitory computer readable medium of claim 15, wherein the prediction of availability comprises an indication of a predicted amount of uninterrupted time before rescinding of the unknown spare resource instance by a service provider of the unknown spare resource instance.

* * * * *